(12) United States Patent
Boushy

(10) Patent No.: US 7,419,427 B2
(45) Date of Patent: Sep. 2, 2008

(54) NATIONAL CUSTOMER RECOGNITION SYSTEM AND METHOD

(75) Inventor: John Michael Boushy, Germantown, TN (US)

(73) Assignee: Harrah's Operating Company, Inc., Las Vegas, NV (US)

( * ) Notice: Subject to any disclaimer, the term of this patent is extended or adjusted under 35 U.S.C. 154(b) by 39 days.

(21) Appl. No.: 09/777,817

(22) Filed: Feb. 5, 2001

(65) Prior Publication Data

US 2002/0142841 A1    Oct. 3, 2002

Related U.S. Application Data

(63) Continuation of application No. 09/088,423, filed on Jun. 1, 1998, now Pat. No. 6,183,362, which is a continuation of application No. 08/653,436, filed on May 24, 1996, now Pat. No. 5,761,647.

(51) Int. Cl.
*A63F 9/24* (2006.01)
(52) U.S. Cl. .............................. 463/25; 463/29; 463/42; 705/10; 705/14; 235/375; 235/380
(58) Field of Classification Search ...................... 463/1, 463/12–13, 16, 20, 25, 29–30, 36, 40–43; 273/138.2, 139, 143 R, 292–293; 235/375, 235/380, 382; 700/91–93; 705/1, 10, 16–18, 705/14; 340/825.3, 825.31, 825.34, 323 R
See application file for complete search history.

(56) References Cited

U.S. PATENT DOCUMENTS 4,531,187 A    7/1985    Uhland ........................ 364/412

(Continued)

OTHER PUBLICATIONS

Kaberline, Brian, "Casinos Hope Gamblers Play Their Cards Right," *Kansas City Business Journal*, vol. 13, No. 1, Sec. 1, p. 1, May 5, 1995.

(Continued)

*Primary Examiner*—M. A Sager
(74) *Attorney, Agent, or Firm*—Fenwick & West LLP

(57) ABSTRACT

A system and method for implementing a customer tracking and recognition program that encompasses customers' gaming and non-gaming activity alike at a plurality of affiliated casino properties. Customer information is accumulated at each affiliated casino through one or more LAN-based management systems, updated to a central patron database (CPDB) that is coupled to each casino LAN through a WAN, and made available to each affiliated casino property as needed. Customer accounts are automatically activated and provided with data from the CPDB when a customer from one casino property first visits an affiliated casino property. Customer accounts are updated with new activity data whenever a management system associated with the casino receives customer data from input devices, such as card readers, workstations, and dumb terminals, located at various venues throughout the casino. Customers are awarded points, based on their tracked activity at all affiliated casino properties. The point awards have a monetary value and are redeemable for gifts, meals, cash and the like, at any of the casino properties. The point awards may embody different promotional schemes in which point awards are adjusted to target different casino properties or different venues within a casino. Summary customer data, including point levels, is regularly updated to reflect ongoing customer activity at the casino property. This data is made available to employees at any affiliated casino property, as needed, to personalize customer services.

9 Claims, 14 Drawing Sheets

U.S. PATENT DOCUMENTS

| | | | |
|---|---|---|---|
| 4,755,941 A | 7/1988 | Bacchi | 364/412 |
| 4,910,677 A * | 3/1990 | Remedio | |
| 5,007,641 A | 4/1991 | Seidman | 273/138 A |
| 5,080,364 A | 1/1992 | Seidman | 273/138 A |
| 5,129,652 A | 7/1992 | Wilkinson | 273/139 |
| 5,179,517 A | 1/1993 | Sarbin et al. | 364/410 |
| 5,255,184 A | 10/1993 | Hornick et al. | |
| 5,257,179 A | 10/1993 | DeMar | 364/410 |
| 5,265,874 A | 11/1993 | Dickinson et al. | 273/138 |
| 5,270,921 A | 12/1993 | Hornick | |
| 5,283,733 A | 2/1994 | Colley | 364/411 |
| 5,287,269 A | 2/1994 | Dorrough et al. | 364/408 |
| 5,321,241 A | 6/1994 | Craine | 235/380 |
| 5,326,104 A | 7/1994 | Pease et al. | 463/25 |
| 5,429,361 A | 7/1995 | Raven et al. | 273/138 A |
| 5,470,079 A | 11/1995 | LeStrange et al. | 273/138 A |
| 5,613,912 A | 3/1997 | Slater | 463/25 |
| 5,639,088 A | 6/1997 | Schneider et al. | 463/25 |
| 5,655,961 A | 8/1997 | Acres et al. | 463/25 |
| 5,722,893 A | 3/1998 | Hill et al. | |
| 5,761,647 A * | 6/1998 | Boushy | |
| 5,762,552 A | 6/1998 | Vuong et al. | 463/25 |
| 5,766,075 A | 6/1998 | Cook et al. | 463/25 |
| 5,770,533 A | 6/1998 | Franchi | 463/42 |
| 5,779,549 A | 7/1998 | Walker et al. | 463/25 |
| 5,800,269 A | 9/1998 | Holch et al. | 463/18 |
| 5,811,772 A | 9/1998 | Lucero | 463/25 |
| 5,813,912 A | 9/1998 | Shultz | 463/25 |
| 5,851,149 A | 12/1998 | Xidos et al. | 463/25 |
| 5,918,209 A | 6/1999 | Campbell et al. | |
| 6,003,013 A * | 12/1999 | Boushy | |
| 6,049,774 A | 4/2000 | Roy | |
| 6,183,362 B1 * | 2/2001 | Boushy | |
| 6,253,187 B1 | 6/2001 | Fox | |
| 6,263,315 B1 | 7/2001 | Talluri | |
| 6,424,949 B1 | 7/2002 | Deaton et al. | |

OTHER PUBLICATIONS

"Even the Low Rollers Should Play Comp Card," *Chicago Sun-Times*, Weekend Plus, Gaming, p. 15, Aug. 5, 1994.

Freedman, David H., "Odds Man In," *Forbes*, pp. 33-35, Oct. 25, 1993.

"Harrah's Toll-Free Res Line Links Six Properties," *Travel Weekly*, vol. 52, No. 82, p. 67, Oct. 18, 1993.

"Introducing the Next Logical Step in Player Tracking", PRC Gaming Systems, PitTrak Brochure.

Freedman, David H., "The Use of PCs to Speed the Comping Process in Bally's Park Place Casin". Dialog File 484:Periodical Abstracts PlusText, Oct. 1993.

"Harrah's Casinos Introduces Two 'First' for the Casino Industry". PR Newswire. Aug. 23, 1993.

Burns, B et al.: *Beware the Sirens*, Gamboling and Gambling in Las Vegas, Noble/House, Ch.2 pp. 9-11, 18-19, copyright 1992.

Kilby, J. et al: *Casino Operations Management*, Elements of an Effective Player Rating System, Wiley & Sons, pp. 198-199, copyright 1998.

Renneisen, R.: *How To Be Treated Like a High Roller . . . Even Though You're Not One, Making Casino Visits More Fun and More Profitable*, Player Ratings, Fleas, Whales and other Casino Life Forms, Carol Publishing, pp. 65-69, copyright 1992.

Rubin, M: *Comp City—A Guide To Free Las Vegas Vacations*, Evolution of Comps Ch. 1 pp. 12-17, Today's Comp System—Ratings, Formulas, Equivalencies, pp. 21-25, Huntington Press, copyright 1994.

Tracy, M: *The Casino Management Handbook—A Practical Guide for Increasing Casino Profits*, Formulas and Definitions, Preston Publishing, Ch 2, pp. 43-58, copyright 1995.

Wolff, P: Lifestyles of a High Roller, Las Vegas, Ch 1pp. 8-9; The Islands, Ch 2, pp. 76-77; Atlantic City, Ch 3, pp. 116-134, Gollehon, copyright 1991.

Musgrave, G., *Entertainment Industry Economics: A Guide for Financial Analysis*, Business Economics, vol. 33 No. 3, pp. 68-69 (Jul. 1998).

Eric Olsen, The Computerized Casino, Electronic Data Technologies, Northwest, Jul. 1987, 5 pages.

Gene G. Marcial, Winning at One-arm Bandits, Business Week, Dec. 7, 1987, 4 pages.

State of Nevada Gaming Control Board, Audit Letter, Nov. 6, 1995, 4 pages.

International Game Technology, SMART Plus (V.1) Casino Management Software, Promotion Operations User's Guide (Preliminary), IGT Part No. 821-621-00, Apr. 26, 1996, 103 pages.

Electronic Data Technologies, PT300 Series Slot Management System, Bates No. SC 034808.

Electronic Data Technologies, PT200 Series Slot Management System, Bates No. SC 034809.

Electronic Data Technologies, PT400 Series Slot Management System, Bates No. SC 034810.

Electronic Data Technologies, PT500 Series Slot Management System, Bates No. SC 034811.

Electronic Data Technologies, PT400 Series Slot Management System, Bates Nos. SC 034797-034802.

Product Brochure, Bates Nos. SC 034805-034807, 3 pages.

Belobaba, P. P., "Application of a Probabilisitic Decision Model to Airline Seat Inventory Control," Operations Research, vol. 37, No. 2, pp. 183-197, Mar.-Apr. 1989.

Bitran, G. R. and Mondschein, S. V., "An Application of Yield Management to the Hotel Industry Considering Multiple Day Stays," Operations Research, vol. 43, No. 3, pp. 427-443, May-Jun. 1995.

Brumelle, S. L., McGill, J. I., "Airline Seat Allocation with Multiple Nested Fare Classes," Operations Research, Operations Research Society of America, vol. 41, No. 1, pp. 127-137, Jan.-Feb. 1993.

Brumelle, S. L., McGill, J. I., Oum, T. H., Sawaki, K., and Tretheway, M. W., "Allocation of Airline Seats Between Stochastically Dependent Demands," Transportation Science, Operations Research Society of America, vol. 24, No. 3, pp. 183-192, Aug. 1990.

Chapman, S. N., and Carmel, J. I., "Demand/Capacity Management in Health Care: An Application of Yield Management," Health Care Management Review, vol. 17, No. 4, pp. 45-54, Fall 1992.

Curry, R. E., "Optimal Airline Seat Allocation with Fare Classes Nested by Origins and Destinations," Aeronomics Incorporated, pp. 1-22, Jun. 1989.

Curry, R. E., "Real-Time Revenue Management," Technical Brief, Aeronomics Incorporated, pp. 1-4, Second Quarter 1992.

Donaghy, K., McMahon, U., and McDowell, D., "Yield Management: an overview," International Journal of Hospitality Management, vol. 14, No. 2, pp. 139-150, 1995.

Dunn, K. D., and Brooks, D. E., "Profit Analysis: Beyond Yield Management," The Cornell Hotel and Restaurant Administration Quarterly, vol. 31, No. 3, pp. 80-90, Nov. 1990.

Hanks, R. D., Cross, R. G., and Noland, R. P., "Discounting in the Hotel Industry: A New Approach," The Cornell Hotel and Restaurant Administration Quarterly, vol. 33, No. 1, pp. 15-23, Feb. 1992.

Harris, F. H. and Peacock, P., "Hold My Place, Please" Yield Management Improves Capacity-Allocation Guesswork, Marketing Management, vol. 4, No. 2., pp. 34-46, Fall 1995.

"Going for Broke—Casino Hotels Lure $100,000 Gamblers with Extravagant Suites", Arizona Republic/Phoenix Gazette Newspaper article, Monday Mar. 2, 1987.

Jauncey, S., Mitchell, I., and Slamet, P., "The Meaning and Management of Yield in Hotels," Interational Journal of Contemporary Hospitality Management, vol. 7, No. 4, pp. 23-26, 1995.

Kimes, S. E., "Yield Management: A Tool for Capacity-Constrained Service Firms," Journal of Operations Management, vol. 8, No. 4, pp. 348-363, Oct. 1989.

Kuyumcu, A. H., "Gaming with Revenue Management," Talus Solutions, Inc., Scorecard Growth Strategies for the Information Age, Technical Brief, pp. 1-8, Summer, 2000.

Lieberman, W. H., "Debunking the Myths of Yield Management" [online] [retrieved on May 15, 2001]. Retrieved from the Internet: <URL: www.abovetheweather.com/ym_myths.pdf>. (First appeared in the Cornell H.R.A. Quaterly, pp. 34-41, Feb. 1993).

Orkin, E. B., "Boosting Your Bottom Line with Yield Management," The Cornell Hotel and Restaurant Administration Quarterly, vol. 28, No. 4, pp. 52-56, Feb. 1988.
Orkin, E. B., "Strategies for Managing Transient Rates," The Cornell Hotel and Restaurant Administration Quarterly, vol. 30, No. 4, pp. 34-39, Feb. 1990.
Relihan III, W. J., "The Yield-Management Approach to Hotel-Room Pricing," The Cornell Hotel and Restaurant Administration Quarterly, vol. 30, No. 1, pp. 40-45, May 1989.
Vinod, B., "Reservation Inventory Control Techniques to Maximize Revenues," The Third International Airline Yield Management Conference, Dec. 3, 1990.
Weatherford, L. R., "Using Prices More Realistically as Decision Variables in Perishable-Asset Revenue Management Problems," Abstract, Journal of Combinatorial Optimization [online]. Oct. 1997, 1(3):277-304. [retrieved on May 15, 2001]. Retrieved from the Internet: <URL: http://www.wkap.nl/oasis.htm/144927>.
Wollmer, R. D., "An Airline Seat Management Model for a Single Leg Route When Lower Fare Classes Book First," Operations Research, vol. 40, No. 1, pp. 26-37, Jan.-Feb. 1992.
Casino Data Systems, "Going Public the IPO Reporter", Mar. 29, 1993, vol. 17, No. 13, 2 pages.
Ylinen, Jerry, "Programmed for Perfection—(Frequent Guest Programs), (Focus on Hotels Special Issue)", Travel Weekly, Apr. 30, 1988, p. 26 (3), vol. 47, No. 38.
F. Legato, "The complete package, Slot and table accounting, player tracking—Gaming Systems International has the solutions, complete and on-line," Casino Journal, p. 93 (Oct. 1995).
Gaming Systems Int'l, "Gaming Management Solutions" brochure.
"GSI Announces Approval of On-Line Slot Accounting System," PR Newswire Assoc., Financial News (Sep. 8, 1994).
Gaming Systems Int'l, "The GSI System, On Line With GSI" brochure.
Gaming Systems Int'l various ads, Int'l. Gaming & Wagering Business, vol. 15, No. 10 (Oct. 5, 1994).
"Promus Companies" and "Bally SDS/6000" ads, Int'l. Gaming & Wagering Business, vol. 15, No. (Jul. 5, 1994).
Gaming Systems Int'l, "MSLink.txt. main program".
"Gaming Systems International Announces Installation of Ship-To-Shore Interface on Louisiana Riverboat," PR Newswire Assoc., Financial News (Feb. 28, 1995).
"Gaming Systems International Announces Agreement To Provide Systems To New Orleans Riverboats," PR Newswire (Nov. 11, 1994).
Gaming Systems Int'l manual, "Cage Management System, User Documentation, The Single Source Solution" (Dec. 8, 1995).
Gaming Systems Int'l manual, "Slot Maintenance System, User Documentation, The Single Source Solution" (Sep. 13, 1996).
Gaming Systems Int'l manual, "Slot Accounting System, User Documentation, The Single Source Solution" (Jan. 22, 1996).
Gaming Systems Int'l manual, "Player Tracking System, User Documentation, The Single Source Solution" (Jan. 31, 1996).
F. Legato, "IGT Gets Smart" Casino Journal, p. 62 (May 1995).
Nevada Gaming Control Board letter from G. Gale to J. McDermott, Primadonna Corporation, dba Buffalo Bill's Resort and Casino (Aug. 3, 1994).
"The IGT Smart System for Buffalo Bill's Upgrade to Player Tracking, Proposal #0034" (Apr. 18, 1995).
"The IGT Smart System for Primadonna Hotel & Casino, Proposal #0032" (Apr. 18, 1995).
"The IGT Smart System for Whiskey Pete's Casino, Proposal #0033" (Apr. 18, 1995).
Nevada Gaming Control Board, "Associated Equipment Reporting Form" for Primadonna Corporation dba Buffalo Bill's Resort & Casino (Jun. 14, 1995).
Nevada Gaming Control Board, "Associated Equipment Reporting Form" for Primadonna Corporation dba Buffalo Bill's Resort & Casino (Nov. 6, 1995).
Nevada Gaming Control Board, "Associated Equipment Reporting Form" for Primadonna Corporation dba Whiskey Pete's Hotel & Casino (May 2, 1996).
Nevada Gaming Control Board, "Associated Equipment Reporting Form" for Primadonna Corporation dba Buffalo Bill's Resort & Casino (May 8, 1996).
Nevada Gaming Control Board, "Associated Equipment Reporting Form" for Primadonna Corporation dba Whiskey Pete's Hotel & Casino (May 8, 1996).
Primadonna Corporation letter from P. Bowen to S. Skrove, Nevada Gaming Control Board (Jun. 14, 1996).
Nevada Gaming Control Board, "Associated Equipment Reporting Form" for Primadonna Corporation dba Buffalo Bill's Resort & Casino (Jun. 6, 1996).
Primadonna Corporation letter from P. Bowen to S. Skrove, Nevada Gaming Control Board (Aug. 16, 1996), with fax cover sheet from T. Bowen to S. Skrove (Jun. 14, 1996).
Nevada Gaming Control Board, "Associated Equipment Reporting Form" for Primadonna Corporation dba Buffalo Bill's Resort & Casino (Aug. 13, 1996).
Nevada Gaming Control Board, "Associated Equipment Reporting Form" for Primadonna Corporation dba Primadonna Resort & Casino (Aug. 13, 1996).
Nevada Gaming Control Board, "Associated Equipment Reporting Form" for Primadonna Corporation dba Whiskey Pete's Hotel & Casino (Aug. 13, 1996).
Primadonna Casino Resorts interoffice memorandum, from T. Bowen to Distribution list, "RE: GCB Approval Letters" (Dec. 12, 1996).
Nevada Gaming Control Board letter from C.B. Harris to T. Bowen, Primadonna Corporation, dba Buffalo Bill's Resort and Casino (Smart 3.0) (Dec. 6, 1996).
Nevada Gaming Control Board letter from C.B. Harris to T. Bowen, Primadonna Corporation, dba Buffalo Bill's Resort and Casino (Smart 3.02) (Dec. 6, 1996).
IGT Gaming Systems letter from R. Moreland to B. Combs, Primadonna Corporation (Jun. 12, 1998).
IGT Software Maintenance Agreement between IGT and Buffalo Bill's (Jun. 12, 1998).
Various screen shots re Grand Casinos "C:WINNT\Systems32\cmd.exe," with redactions.
Various screen shots re Biloxi and Gulfport systems, with redactions.
Casino Data Systems press release, "CDS Signs Major Contract With Grand Casinos For Player Tracking And Slot Accounting Systems" (Jan. 13, 1993).
Deposition Transcript of Alistair Crighton (Sep. 17, 2002), Harrah's Entertainment, Inc. v. Station Casinos, Inc.
L. Steinberg, "GSI Install Worldwide," Casino World (Nov. 1994).
A. Crighton handwritten drawings and notes re "Tables, Slot Acct, Cage-PTS" (Sep. 17, 2002).
Nevada Gaming Control Board letter from G. Gale to C. Stafford with attachments (Nov. 6, 1995).
"EDT, Electronic Data Technologies" cover.
EDT brochure, "EDT Wants to Introduce You to Someone,".
G. Marcial, "Inside Wall Street, Winning at One-Arm Bandits," Business Week, Finance, p. 114 (Dec. 7, 1987).
EDT brochure, "It's a Whole New Ball Game".
Casino Data Systems "Oasis™ II and ProLINK™ Progressive Systems" brochure (1995).
R. Gros, "When It Comes To Comps . . . Ceasars Rates!," Casino Player (Jun. 1993).
S. Rosen, "Casino Marketing, Why comping policies must by flexible, not mathematical," Casino Journal, vol. 6, No. 5, p. 14 (Jul. 1993).
J. Busam, J. Grochowski, L. Mohn, E. Morris-Sayre, J. Plume, G. Schnorbus, "Joining Clubs, Casino Player's annual round-up of the Best slot clubs in the Country," Casino Player (Dec. 1994).
R. Gros, "Casinovations, Take it or leave it!, Self-comp programs expand at Atlantic City casinos," Casino Player (Mar. 1995).
A. Curtis, "The Key To Comps, A Comp For Every Budget," Casino Player, pp. 33-34 (Aug. 1995).
F. Legato, "Gaming Technology Review, At Your Service, Crunching the Numbers, Computerized Accounting and player tracking systems make understanding the business easier," Casino Journal (Dec. 1992).
F. Legato, "Gaming Technology Review, Player Tracking, Systems companies embrace advances in computer technology to offer casino hotels unprecedented marketing tools.," Casino Journal, vol. 8, No. 5 (May 1995).

Casino Data Systems ad, Int'l. Gaming & Wagering Business, vol. 14, No. 9, (Sep. 15, 1993-Oct. 14, 1993).
"Slot tracking systems review," Int'l. Gaming & Wagering Business (Apr. 5, 1994) (Oct. 5, 1994).
Harrah's Gold Card, 6 Good Reasons Why You Should Not Go Home Without One! brochure.
"Better Privileges for Better People" and Bally SDS/6000 ads, Harrah's World.
Casino Data Systems Lauches 'CoolMillions™', PR Newswire (Nov. 22, 1994).
Memo: "Re: 'Cool Millions' Advertising" (Dec. 2, 1994).
Grand Casino brochure, "Grand Advantage Players Club".
Int'l Game Technology, "SMART Plus (V.1), Casino Management Software, Promotion Operations User's Guide (Preliminary)" (Apr. 26, 1996).
"CDS Slot New Patron Record Population" (Nov. 16, 2001).
"CDS Slot Play Population" (Nov. 16, 2002).
Grand Casino Gulfport, "Grand Advantage Players Club" card.
Grand Casino Gulfport, "Welcome to the Club" letter with coupon (Aug. 4, 1995).
Grand Casino Gulfport, "Area Merchant Member Guide, There's More than One Advantage with this Card" brochure.
Grand Casino Gulfport, "Area Merchant Member Guide, This Card Is Simply the Best!" brochure.
Grand Casino Gulfport, "Merchants Discount Guide for Grand Advantage Player Cub Members" brochure.
Grand Casino Gulfport, "Gazette" newsletter, Guest Issue (Dec./Jan. 93/94).
Grand Casino Gulfport, "Gazette" newsletter, Guest Issue (Mar./Apr. 94).
Grand Casino Gulfport, "Gazette" newsletter, Guest Issue (May/Jun. 94).
Grand Casino Gulfport, "Gazette" newsletter, Guest Issue (Jul./Aug. 94).
Grand Casino Gulfport, "Gazette" newsletter, Guest Issue (Jul./Aug. 95).
Grand Casino Gulfport, "Gazette" newsletter, Guest Issue (Nov./Dec. 95).
Grand Casino memo from C. Bauman to C. Ross, et al., "RE: Grand Advantage" (Jul. 13, 1994) with "Grand Advantage Basics, A Grand Casino Skills for Success Module Instructor's Guide" attached (Apr. 20, 1997).
S. Lea, "It's All In The Cards," Casino Explorer, vol. 3, No. 3 (Mar.-Apr. 1995).
Grand Advantage Players Club letter from A. Miller to S. Lea, Explorer Publications (Jan. 27, 1995) with handwritten notes.
"Grand Advantage Players Club Gaming Qualifications" (Feb. 16, 1995).
Grand Casino memorandum from A. Miller to S. Chabre, et al., "RE: Gazette Database Stratification" (Mar. 29, 1995) with "Report 1—Point Count Report (Grand Casino, Biloxi)" and Report 2—Accumulative Totals of States (Grand Casino, Biloxi) (Mar. 23, 1995) attached.
Grand Casino Gulfport, "Grand New Club, Grand Advantage Players Club" membership brochures.
Casino Data Systems, "Technical Notes" binder (release data Jan. 95-Mar. 96).
Casino Data Systems, "OASIS System II Turbo, User Reference Manual," 23-00061-00 (Aug. 1995).
Grand Casino letter from to Mr. Lappe (Feb. 13, 1995) with handwritten notes, and attached letter from D. Lappe, Lappe Heating & Air Cond., Inc. to Martha (Feb. 7, 1995).
Casino Data Systems memorandum from S. Chabre to T. Harrington, et al., "RE: Super Playmate Manual" (Mar. 29, 1996), with "Super Playmate Manual," 23-000115-01 (Feb. 1996) attached.
Casino Data System, "OASIS Quick Tips, Poller Version 4," brochure 23-00059-00.
Oasis, "Consideration for the Mosler Currency Interface Install".
Casino Data System memorandum from R. Guinn to J. Mandel, et al., "Re: Recent Problem at Grand Casino Gulfport" (Aug. 18, 1995).
"Procedures for bringing Poller and/or Database Manager up/down" document.
"Instructions to rebuild SUPER.DAT!" document.
Handwritten calculations "6 hrs 40 min."
"DaVinci Mail Admin, To correct Name Problems" document with screen shots.
Mosler Interface "Software Configuration" document.
Mosler Interface "DIP Switch Settings, Commands, Messages and Pin-Outs" document.
"Miscellaneous" document.
Mosler Interface "Batch Files" document.
"Backup Procedures for Btrieve Files" document.
"Grand Advantage Gold Card, Implementation Guidelines" manual.
Grand Casinos "Implementation Plan Player Managed Reward Program" presentation/documents.
Grand Casinos memorandum from R. Schuetz to C. Barron, et al., "RE: Implementation Plan Player Managed Reward Program" (Jan. 16, 1995) with documents attached.
Casino Data Systems, "Grand Casinos Oasis System Overview, 1995" presentation, with "Oasis System Overview" folder cover attached.
Casino Data Systems, "Oasis™ Programs User/Reference Manual," (release dates Jan. 1995-Mar. 1996).
Casino Data Systems, "Bracket & Overlay Selection Guide," vol. IV, 23-00075-00, presentation (Feb. 19, 1996).
H. Desespinasse, "Mirage Resorts, Bricklayers" DIRECT, Jun. 15, 1996.
Gaming Systems Int'l ad, "When the World Turns to Gaming, You've Got to Get connected," Casino Journal, p. 42 (Nov. 1994).
"Entertainment, Station Casinos goes by the numbers," The Cowles Report on Database Marketing, vol. 5, No. 12 (Dec. 1996).
L. Riggs, "Nevada Casino Complex Consolidates Database, Part of first-ever direct marketing efforts," DM News, vol. 17, No. 36 (Sep. 25, 1995).
PRC Gaming Systems ad, "Introducing the next logical step in player tracking," Casino Journal, p. 30 (Apr. 1995).
PRC Gaming Systems ad, "New Pit Boss at the Peppermill," Casino Journal, p. 10 (May 1995).
Misc. articles(s), Casino Player, pp. 24, 32-33 (Dec. 1994).
F. Legato, "Casino Computers, Technology Does much More Than Simply Track Players," Casino Journal, pp. 56-57 (Jan. 1994).
F. Legato, "Bally Systems, Mastering the Technology," Casino Journal, pp. 48-49 (Jun. 1994).
Misc. article, Casino Journal, p. 58 (May 1995).
Station Casinos Binder cover and Index, "Miscellaneous Prior Art".
M. Ruben, "Comps Las Vegas Style," Casino Player, pp. 24, 39 (Jun. 1993).
G. Schnorbus, "Casino Junkets, Playing the comp game in Atlantic City and Las Vegas," Casino Player, pp. 22, 52 (Apr. 1994).
"Joining Clubs, Casino Player's annual round-up of the Best slot clubs in the country," Casino Player (Dec. 1994).
F. Legato, "Crunching the Numbers, Computerized accounting and player tracking system make understanding the business easier," Southen Nevada Casino Journal, vol. 5, No. 10 (Dec. 1992).
F. Legato, "Player Tracking, Systems companies embrace advances in computer technology to offer casino hotels unprecedented marketing tools," Casino Journal, vol. 8, No. 5, pp. 54, 56-58, 64-65 (May 1995).
Mikohn Gaming Corp. ad, "Only CasinoLink Give You The Whole Picture," Int'l Gaming & Wagering Business, vol. 18, No. 6, pp. 1, 16-17 (Jun. 1, 1995).
Casino Data Systems ad, "Grand Casino Gulfport has the most advanced slot accounting and player tracking system in the world," Int'l Gaming & Wagering Business, vol. 4, No. 9, p. 66 (Sep. 15, 1993).
Harrah's brochure, "Harrah's Gold Card".
Harrah's brochure, "Harrah's World, Better Privileges for Better People".
Bally Gaming, Inc. ad, "Bally SDC/6000 is uniquely positioned to provide Harrah's with right and accurate information" (1994).
N.J. Admin Code tit. 19, § 45-1.2, 34 N.J. Reg. No. 9 (May 6, 2002).
N.J. Admin Code tit. 19, § 45-1.9, 34 N.J. Reg. No. 9 (May 6, 2002).
N.J. Admin Code tit. 19, § 45-1.9B, 34 N.J. Reg. No. 9 (May 6, 2002.
J. Robbins, "Radio Helps Casinos Spot Big Spenders," Reno Gazette-Journal (Jan. 18, 1995).

PRC Gaming Systems brochure, PitTrak™ Player Tracking System, Introducing the next Logical Step in Player Tracking.
"PRC Player Tracking Systems add 44 tables," Central States Gaming, vol. 1, No. 12, p. 3 (Apr. 17, 1995).
"What's News, A review of the latest happenings in electronics," Electronics Now, p. 4 (Aug. 1993).
J. Rzadzki, "Instant Information," Int'l Gaming & Wagering Business, p. 48 (Dec. 1, 1995).
"GSI Completes Installation of Casino Management System at Northern Lights Casino In Wabeno, Wisconsin," PR Newswire, Financial News (Apr. 17, 1996).
"Information at your fingertips," Int'l Gaming & Wagering Business, p. 205 (Oct. 1996).
"CSI/GSI to move Coinless Gaming Into the Mainstream," PR Newswire (May 19, 2000).
"GSI Installs Wireless Slots at Jackson Rancheria Casino; System Also Impresses World Gaming Congress and Expo Attendees," PR Newswire, Financial News (Nov. 8, 2000).
J. Rowe, "United Gaming Expects Expansion Plan to Yield Long-Term Growth in Earnings," The Wall Street Journal (Nov. 17, 1989).
"Offer is Made for 2 Casinos," The New York Times, Business/Financial, Section D, p. 6, col. 6 (Jun. 28, 1995).
"Company News, For Want of a Buyer, Hilton Hotels Approves a Split," The New York Times, Business/Financial, Section D, p. 4, col. 1 (Jun. 28, 1995).
"Wynn Makes His Return to Atlantic City," The New York Times, Business/Financial, Section D, p. 13, col. (Jun. 28, 1995).
A. Zidenberg, "The Nuts & Bolts of a Casino Junction, What to Expect When Traveling with a Casino Group," Casino Player, pp. 22-23 (Nov. 1991).
Oasis™ System II, Slot Information System with Player Tracking, Technical Prospectus for Circus-Circus Properties (Oct. 2, 1992).
Misc. software instructions, CSS Installation Guide, etc. (1992-1993), with handwritten notes.
D. Palermo, "Jackpot network cater to bar, restaurant players," Las Vegas Review-Journal (Jan. 7, 1996).
P. Yakubik, "Gamblers get bonus with new slot club," Las Vegas Review-Journal (Feb. 20, 1996).
H. Smith, "A newcomer to gaming hits the ground running," Las Vegas Review-Journal (Apr. 28, 1998).
Electronic Data Technologies brochures, "EDT PT 200 Series, Slot Management System," "EDT PT 300 Series, Slot Management System," and "EDT PT 400 Series, Slot Management System," "EDT PT 500 Series, Slot Management System".
Casino Data Systems, "Documents" (Fall 1994).
"Notes, chapter 8, note 1, River City"www.rivergate.tulane.edu/notes_ch8note1_larger.html (Oct. 8, 2002).
"Let the Games Begin," Times-Picayune Publishing Corp., Money (3rd Ed.) (Mar. 30, 1995).
J. Meitrodt, "Canizaro, Hammeter Strike A Deal, Developer Sells Riverfront Acreage to Casino Interests," Times-Picayune Publishing Corp., Money (3rd Ed.) (Jul. 16, 1994).
Oneida Bing & Casino webpage "About Us," www.oneidabingoandcasino.net/about/about.html (Oct. 10, 2002).
"Oneida Bingo and Casino, A Total Experience," www.wisconsingaming.com/ototal.html (Oct. 10, 2002).
Oneida Bingo & Casino webpage, www.oneidabingo&casino.net/experience/bingo1_tour.html (Oct. 10, 2002).
Oneida Bingo & Casino webpage "Calendar of Events" www.oneidabingoandcasino.net/slots/slots/html (Oct. 10, 2002).
Form 10-Q, Securities and Exchange Commission, "Capital Gaming International, Inc.," period ending Mar. 31, 1994 (May 11, 1994).
Form 10-Q, Securities and Exchange Commission, "Capital Gaming International, Inc.," period ending Mar. 31, 1995 (May 11, 1995).
Form 10-K, Securities and Exchanges Commission, "Capital Gaming International, Inc.," fiscal year end Jun. 30, 1994 (Sep. 7, 1994).
Form 10-K, Securities and Exchange Commission, "Capital Gaming International, Inc.," fiscal year end Jun. 30, 1995 (Sep. 29, 1995).
Form 10-Q, Securities and Exchange Commission, Hemmeter Enterprises Inc., period ending Mar. 31, 1996.
Form 10-K, Securities and Exchange Commission, "Capital Gaming International, Inc.," fiscal ending Mar. 31, 1996.
Amended Complaint for Patent Infringement, *Harrah's Entertainment, Inc., and Harrah's Operating Company, Inc. v. Station Casinos, Inc., et al.*, No. CV-S-01-0825-KJD-RJJ, United States District Court, District of Nevada (Mar. 21, 2002).
Amended Answer and Counterclaim, *Harrah's Entertainment, Inc. and Harrah's Operating Company, Inc. v. Station Casinos, Inc., et al.*, No. CV-S-01-0825-KJD-RJJ, United States District Court, District of Nevada (Apr. 22, 2002).
Harrah's Entertainment, Inc.'s and Harrah's Operating Company, Inc.'s Reply to Defendants' Amended Answer an Counterclaim, *Harrah's Entertainment, Inc., and Harrah's Operating Company, Inc. v. Station Casinos, Inc., et al.*, No. CV-S-01-0825-KJD-RJJ, United States District Court, District of Nevada (May 29, 2002).
Order Granting Defendants' Motion for Partial Summary Judgment Of Invalidity Under 35 U.S.C. § 112, *Harrah's Entertainment, Inc., and Harrah's Operating Company, Inc. v. Station Casinos, Inc., et al.*, No. CV-S-01-0825-KJD-RJJ, United States District Court, District of Nevada (May 19, 2004).
Order Denying Defendants' Motion For Partial Summary Judgment Of Patent Unenforceability Due to Inequitable Conduct, *Harrah's Entertainment, Inc., and Harrah's Operating Company, Inc. v. Station Casinos, Inc., et al.*, No. CV-S-01-0825-KJD-RJJ, United States District Court, District of Nevada (May 19, 2004).

* cited by examiner

NATIONAL CUSTOMER RECOGNITION SYSTEM AND METHOD

RELATED PATENT APPLICATION

This patent application is a continuation of application Ser. No. 09/088,423, now U.S. Pat. No. 6,183,362, filed on Jun. 1, 1998, which was a continuation of Ser. No. 08/653,436, now U.S. Pat. No. 5,761,647, filed on May 24, 1996, and all assigned to the same assignee as the present application, which patents are incorporated in their entirety by reference herein.

BACKGROUND OF THE INVENTION

1. Technical Field

This invention relates to the field of systems for tracking customer activity at casinos, and in particular, to systems for tracking customers' gaming and non-gaming activity across affiliated casino properties, for use in customer recognition and marketing programs.

2. Background Art

Substantially all casinos have implemented some form of customer tracking to identify and reward their valuable customers. These tracking programs often use the betting activity of a customer as the basis for awarding the customer complementary rooms, meals, event tickets, and the like ("comps"). Typically, these tracking programs are implemented by providing each customer with a casino membership card which includes a machine readable identification number specific to the customer. Each identification number has an associated customer account that is stored in the casino's computer system and updated to reflect customer activity. Customers need only insert their cards in slot machines or card readers associated with gaming tables or give their cards to a casino employee to have their betting activity monitored and reflected in their accounts. Customer cards may also be used to track customer activity at casino venues, such as special events, showrooms, and hotels, through card readers and computer terminals manned by casino employees.

The growth of the gaming industry has created new challenges to the way in which customer tracking programs are implemented. Many states and territories have recently legalized casino gambling, and companies have built casino properties at these new gaming locations to meet the demand for gaming facilities. Despite the increased number of casino properties affiliated with a company, conventional casino management practices continue to treat these casino properties as autonomous, decentralized entities that compete with each other for valuable customers. In particular, customer tracking at each casino property is typically controlled by local management, and few if any attempts have been made to coordinate customer information across affiliated casino properties. For example, each casino has its own system that tracks betting data on the casino's customers. The property treats this betting data as confidential, in order to prevent competing casinos, including those affiliated with the property, from luring away valuable customers. Thus, customer tracking programs at affiliated properties remain fragmented, and conventional management practices provide little incentive to coordinate data accumulated by these tracking programs.

Even if a casino company was to attempt some coordination of customer tracking programs at its affiliated casinos, the systems currently in place at various casino properties are too localized to integrate easily. Casino management systems are typically custom designed for each casino property, the customer data is limited to selected customer activity at the specific casino property, and the customer data accumulated by different computer systems within the same casino is often in different, incompatible formats. Thus, while each casino has useful data for its regular customers, there is no ready means for consolidating this data or making it available conveniently for use at other casinos. In short, there are both operational and technical barriers to coordinating customer tracking programs at individual casino properties into national, company-wide tracking and marketing programs.

SUMMARY OF THE INVENTION

The present invention is a system and method for implementing a customer tracking and recognition program that encompasses customers' gaming and non-gaming activity alike at all casino properties affiliated with a casino company. Customer information is input to a management system associated with each affiliated casino property, updated to a patron database, and made available to each casino property as needed. This provides casino employees at each property with on-line access to the customer data necessary to implement cross-property incentive programs and to provide personalized services to customers, independent of which casino property the customer regularly visits. Marketing personnel have access to a more complete database of customer activity for developing and monitoring marketing programs, including offer management and redemption programs. The present invention allows customer data to be accumulated across all casino properties and made available at any casino property without overburdening the individual casino properties' computer systems with unnecessary data.

A system in accordance with the present invention comprises a local area network (LAN) at each affiliated casino property and a wide area network (WAN) for coupling data among the casino LANs. A management system associated with each casino LAN receives customer data from card readers, workstations, and dumb terminals, located at various venues throughout the casino and couples the received data to a database that is accessible to all affiliated casino properties. In a preferred embodiment of the invention, a central patron database (CPDB) comprising customer accounts from all of the casino properties is supported on a central LAN that is coupled to the casino LANs through the WAN. In this embodiment, the management system may be a single, centralized system supported on the central LAN, a distributed system comprising local management systems associated with each casino LAN, or a hybrid system including both centralized and distributed components. The preferred configuration for the management system will depend on the data capacity of the WAN and the sizes of the various casino properties.

In the preferred embodiment of the invention, the management system further comprises a casino management system to handle the day to day gaming transactions at various casino venues and hotel and event management systems to handle transactions relating to lodging and events, respectively. Data accumulated by the management system is updated to the CPDB, where it may be accessed by personnel at any of the casino properties through the WAN. When customer information is required at a casino property, the management system first checks a data store associated with the property, and if the data is not available there, it is retrieved from the CPDB. On-line access to a customer's activities at all of its casino properties allows the casino company to implement cross-property incentive programs, manage customer offer programs more effectively, and provide more personalized services to its customers. Data is available for a customer's gaming and non-gaming activities, giving the casino a more complete picture of the customer's expenditures while at the casino.

For example, the system of the present invention facilitates and expands comping. By tracking customers' gaming activities at all of the company's casino properties, the present invention provides more complete data on which to base comps and provides the same, complete data to each casino employee, regardless of how frequently the customer visits their property. This allows valued customers to be recognized at any casino property affiliated with the company, regardless of which casino they patronize regularly. It also makes comping more consistent across different casino properties.

In addition to comping, the present invention implements a point system that awards points to customers based on their tracked activity at all casino properties. Customer points earned at any of the affiliated casino properties may be redeemed for gifts or services at any of the affiliated casino properties. In effect, a customer's points represent a monetary value of the customer's activity, and may be used in place of cash at any affiliated casino, independent of where the points were earned. The point system may be used to target various properties or venues by weighting point awards according to the venue, the time period, or the casino property at which the points are generated. This allows new casino properties or venues at existing casino properties to be promoted by awarding extra points to customers who visit the targeted property or venue.

The term "affiliated casinos", as it is used throughout this disclosure, is intended to indicate any of a number of different relationships between casino properties. For example, casinos may be affiliated through common ownership by a parent company, they may be owned by different companies operating under a cooperation agreement, or they may be under contract with the same provider for customer tracking services.

DETAILED DESCRIPTION OF THE INVENTION

The present invention is described in detail for a configuration of the national customer recognition system comprising a central patron database (CPDB) on a central LAN that is coupled to local management systems associated with each casino LAN. This configuration is particularly useful for companies that have already invested significant capital in local management systems for their casino properties, because it leverages these systems into a company-wide network through the addition of a CPDB. The system configuration employing a centralized management system with a CPDB and the system configuration employing distributed management and database systems are discussed in conjunction with FIGS. 2C and 5, respectively.

Figure 1:
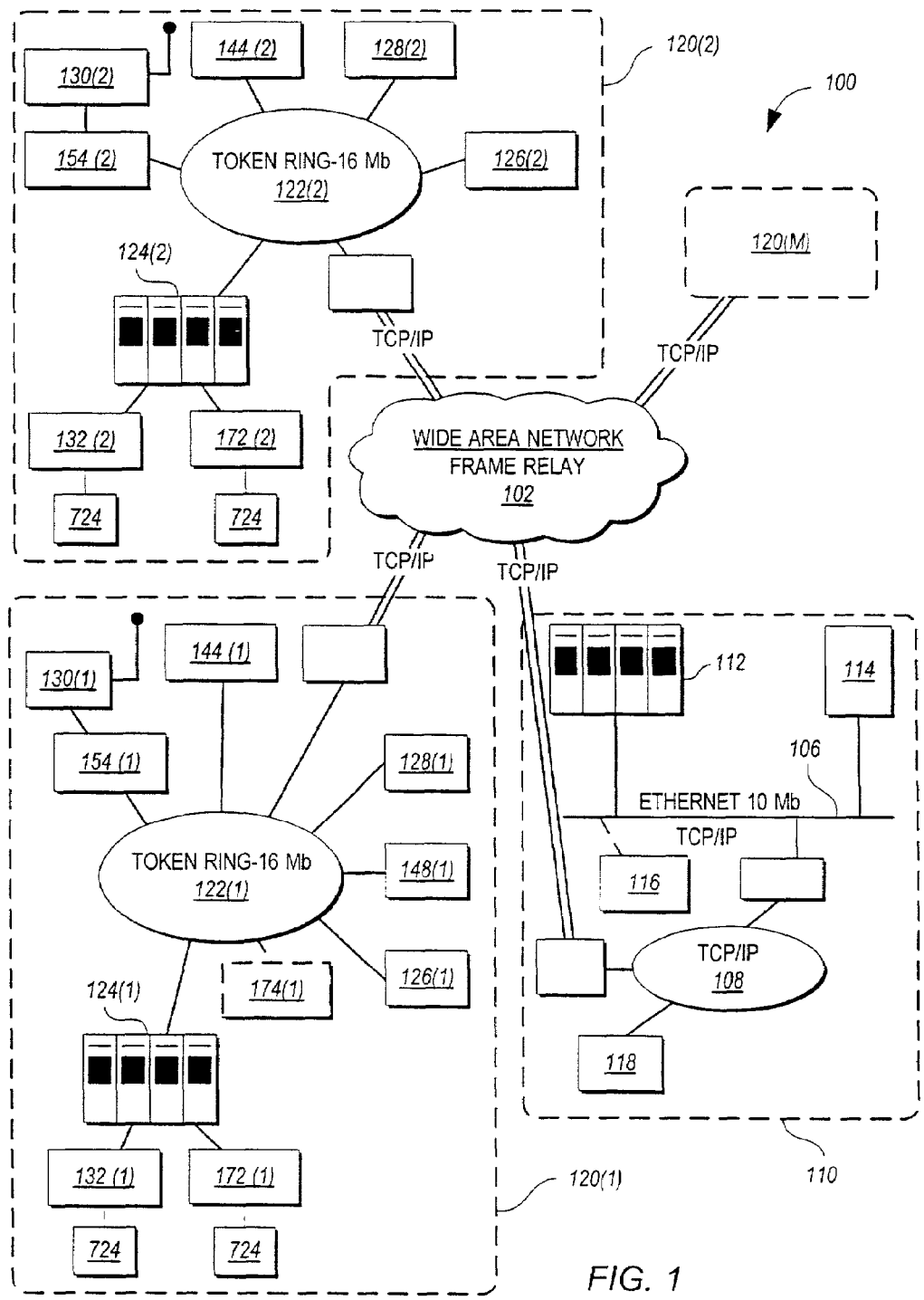
FIG. 1 is an overview of a national customer recognition system in accordance with the present invention.

Referring first to FIG. 1, there is shown an overview of a computer network 100 for implementing the system and method of the present invention. Computer system 100 is shown comprising a central database LAN 110 and casino LANs 120(1)-120(n), each of which is associated with one of the affiliated casino properties. Central database LAN 110 and casino LANs 120(1)-120(n) are coupled through a wide area network (WAN) 102. Typically, central database LAN 110 will be located at a central facility of the casino company.

In the following discussion, LAN 120 designates any one of casino LANs 120(1)-120(n) unless otherwise noted. Similar notation, i.e. unindexed reference numbers, is used for the various components of LANs 120(1)-120(n). It is understood that in a typical application, computer system 100 includes one or more LANs 120 for each casino property affiliated with the parent casino company, and all LANs 120 communicate with central database LAN 110 through WAN 102. This configuration allows each LAN 110, 120 to operate in a substantially independent manner until it requires access to data available on a different network.

In the disclosed embodiment, central database LAN 110 comprises an ethernet 106 to which a central database server 112 and a marketing support server 114 are connected. An optional server 116 on LAN 110, supports a centralized management system (CMS 284, FIG. 2C) in the fully centralized configuration of the national customer recognition system. A token ring 108 is also shown connecting ethernet 106 to WAN 102. Token ring 108 typically includes additional nodes, such as workstation 118, for marketing and local processing. Central database server 112 includes a central patron database (CPDB 220, FIG. 2A), comprising customer accounts based on data originating at each casino property affiliated with the company. For the embodiment employing distributed management systems (CMS 234, FIG. 2B), central database server 112 is the only essential node on LAN 110. However, it is likely that in most implementations, other nodes such as workstations 118 and marketing support server 114 will be available for marketing analysis using data derived from CPDB 220.

In the preferred embodiment of the invention, marketing support server 114 includes customer data from CPDB 220 stored in a manner that facilitates its use for marketing purposes. For example, customer data may be sorted and stored in server 114 according to customer groups segmented by profitability, principal gaming location (property), or other marketing criteria. On the other hand, customer data in server 112 is stored in a manner that facilitates rapid access by customer ID or name.

Figure 2A:
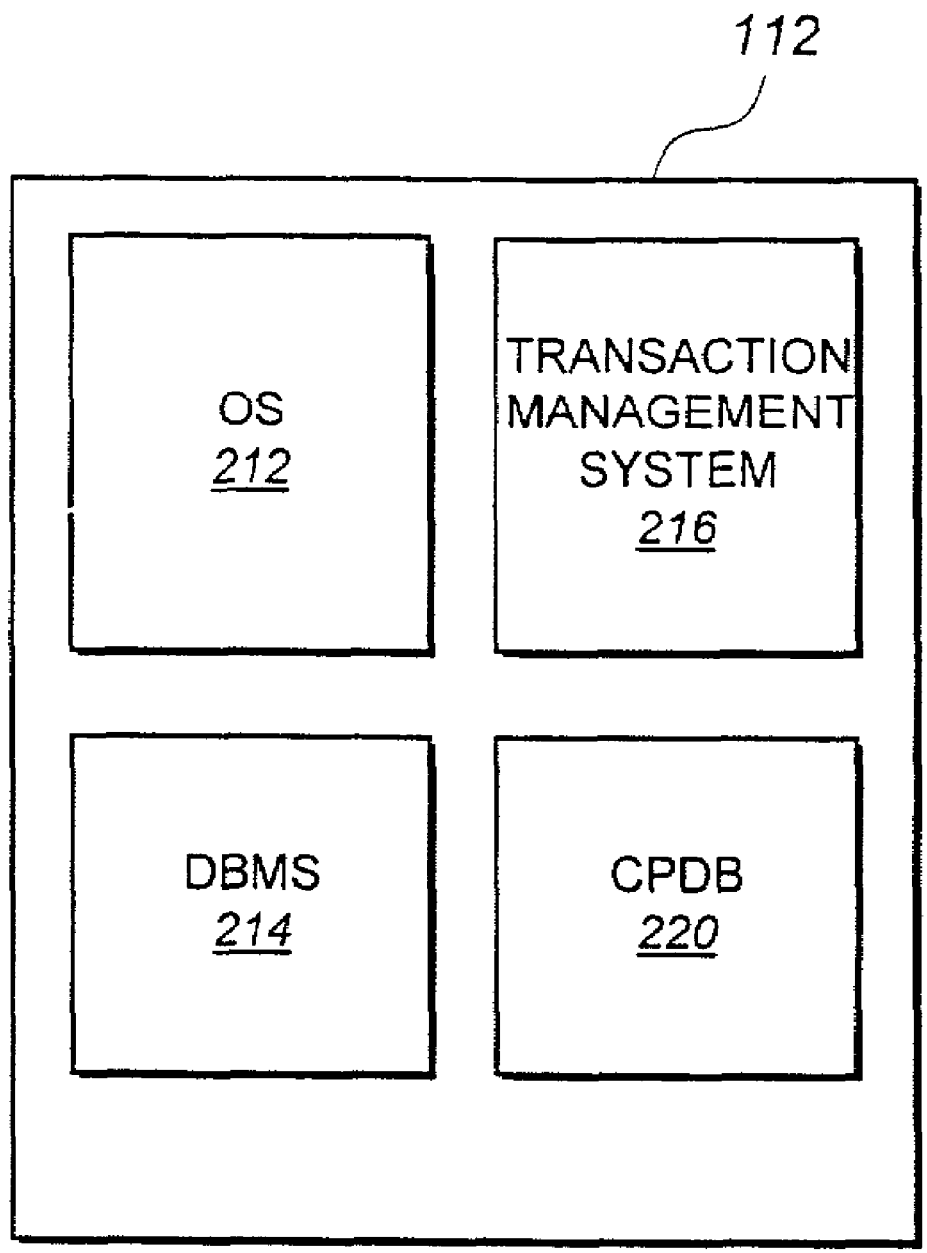
FIGS. 2A, 2B, and 2C are block diagrams of the various system modules supported in the central database server and a casino property LAN, respectively, for different configurations of the customer recognition system.

Referring now to FIG. 2A, there is shown a block diagram of various systems supported on central database server 112. These include an operating system (OS) 212, a database management system (DBMS) 214, a transaction management system 216', and central patron database (CPDB) 220. Transaction management system 216' supports messaging between casino LANs 120 and services on central LAN 110, such as CPDB 220, allowing them to exchange data as necessary. In the disclosed embodiment, central database server 112 is an NCR 3555 computer, OS 212 is Unix SVR4, DBMS 214 is Informix 7.1, and transaction management system 216' is TOP END, available from AT&T/NCR. Central LAN 110 employs TCP/IP communication protocol for communications among the nodes of ethernet 106 and token ring 108.

Referring again to FIG. 1, each casino property LAN 120 is shown with the same basic structure. For purposes of illustration, LAN 120 is shown comprising a token ring 122 to which are connected computers 124, 144, 154, a gateway server 126, and workstations 128, 148. Dumb terminals 132 and PCs 172, which are connected directly to computer 124, are typically associated with gaming tables (FIG. 3), and slot machines 130 are coupled to computer 124 through a slot computer 154 and token ring 122. Thus, all gaming-related activity is routed to computer 124.

A person skilled in the art will recognize that LANs 120 associated with different properties may vary from this structure in order to accommodate special needs at different casino properties, without altering the nature of the present invention. For example, a casino property lacking a hotel or event venue would not include computer 144 or workstation 128 and their associated lodging and event management systems, respectively. In addition, other LAN protocols, including ethernet and the like, may be used instead of token ring 122.

Figure 2B:
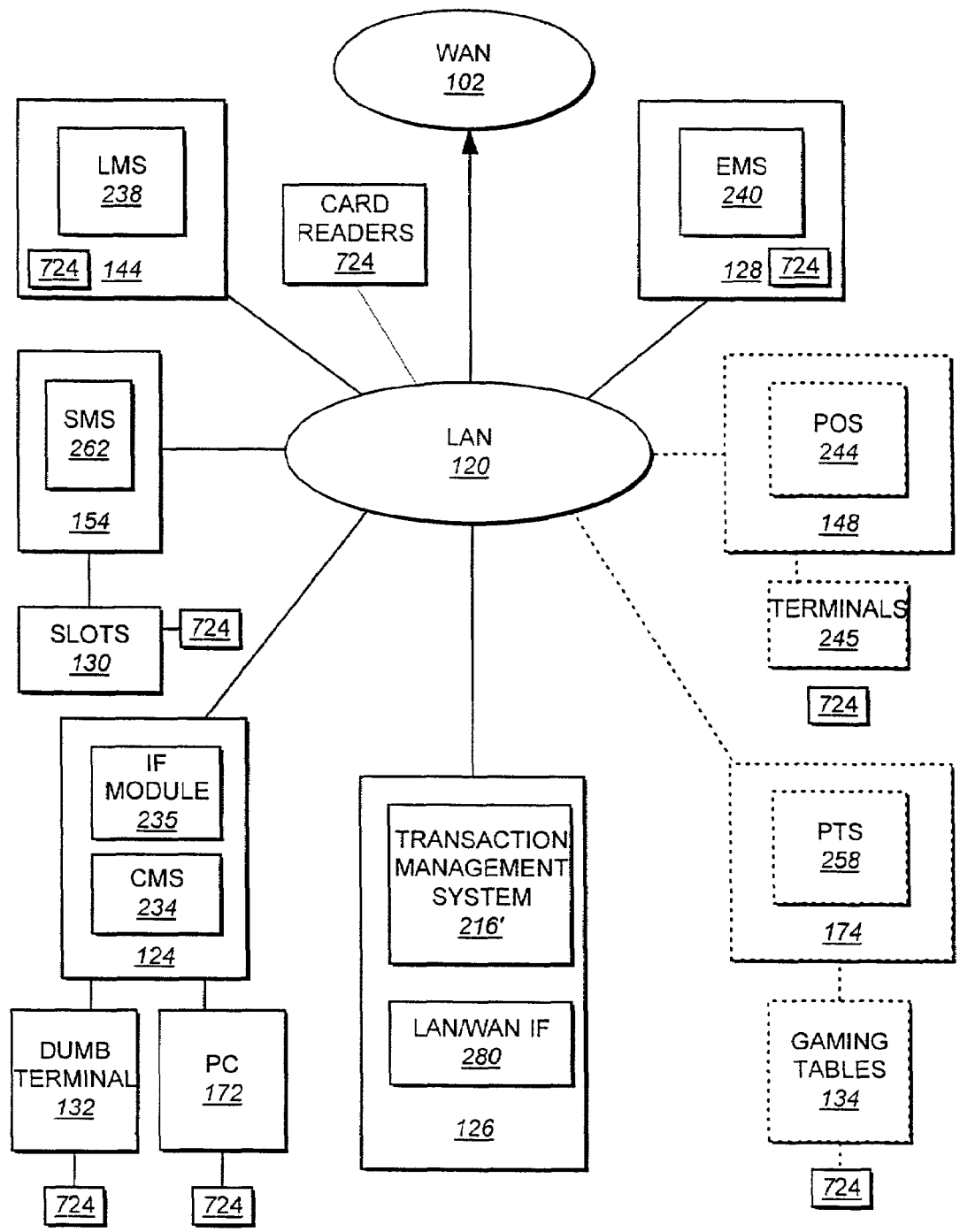

Referring now to FIG. 2B, there is shown a detailed block diagram of LAN 120, indicating a casino management system (CMS) 234, lodging management system (LMS) 238, and event management system (EMS) 240, associated with various LAN nodes (computers 124, 144, and workstations 128, respectively), for monitoring, tracking, and controlling different areas of casino operations. In a preferred embodiment of the invention, CMS 234 includes Report Program Generator (RPG)-based programs for on-line transaction processing (OLTP) applications. These applications consolidate activity data at the casino property related to gaming, and access CPDB 220 to retrieve or store data, as necessary. For example, dumb terminals 132 and PCs 172 communicate customer gaming activity data from gaming tables to CMS 234. Dumb terminals 132 and PCs 172 may also be used for tracking customers' currency and marker transactions and for accessing gaming activity that is tracked through a slot computer 154.

Automatic bet tracking at slot machines 130 is monitored by a slot monitoring system (SMS) 262 on computer 154, which couples accumulated bet tracking data to CMS 234 through token ring 122. In the preferred embodiment, bet tracking is accomplished through a card reader (not shown) associated with slot machine 130. A customer inserts his or her identity card in the card reader to initiate bet tracking and removes it to terminate bet tracking. A customer's betting activity at slot machine 130 is accumulated in SMS 262 until the session is terminated or an account status is requested by CMS 234, at which time the data is transferred to CMS 234 via LAN 120.

LAN 120 may optionally include a pit tracking system (PTS) 258 to automatically track customer activity at gaming tables 134. PTS 258 is shown supported on a computer 174, which couples customer activity data to CMS 234 through LAN 120. PTS 258 uses card readers associated with player positions at gaming tables to track customers' betting activity. Estimates of betting activity are based on a player's time at a gaming table and the minimum bet at the table. Systems for automatically tracking betting activity at slot machines and gaming tables are well known in the art and are not described in greater detail here.

In the preferred embodiment of the invention, a lodging management system (LMS) 238 is maintained on computer 144. However, there is no reason that CMS 234, LMS 238 and any other management systems could not be supported on the same computer or some different combination of computers. LMS 238 comprises the software necessary for managing hotel operations within the casino, including reservations, room service, and other activities associated with hotel operations. In a preferred embodiment of the invention, LMS 238 communicates with CMS 234 to search locally for selected customer information available on that system. However, LMS 238 may include its own local data store for customer data.

Also shown in FIG. 2B is an event management system (EMS) 240 on workstation 128 and a restaurant/retail point of sale system (POS) 244 coupled to workstation 148. EMS 240 comprises software for handling ticketing information, reservations, and sales. POS 244 comprises accounting software for operating restaurants and retail venues within the casino property as well as software for transmitting charge information to other management systems. For example, data relating to meals charged to rooms or redeemed meal comps are coupled from POS 244 to LMS 238 and CMS 234, respectively, through LAN 120.

The primary role of gateway server 126 is to provide a link between selected nodes of LAN 120 and central database server 112 through WAN 102 and LAN 110. For this purpose, gateway server 126 includes a LAN/WAN interface 280 that couples data packets between the communication protocols of LAN 120 and WAN 102 and another instance of transaction management system 216 that routes data packets between management systems 234, 238, 240 and selected services in CPDB 220. In the preferred embodiment of the invention, CMS 234 on computer 124 accesses CPDB 220 through transaction management system 216', 216, while LMS 238 and EMS 234 access CPDB 220 through CMS 234, as discussed below. An interface module 235 in CMS 234 provides communication links with transaction management system 216, as discussed below.

In the disclosed embodiment of the invention, computers 124, 144 are IBM AS/400 computers, computer 154 is an IBM RS6000, gateway server 126 is an NCR 3410, workstations 128, 148 are based on '486 or better processors, and transaction management system 216, 216' is AT&T's TOP END. WAN 102 employs TCP/IP, an open communication protocol, while LANs 120 employ an IBM communication protocol, LU6.2. LU6.2 allows direct communication between LAN nodes, but it is not the preferred protocol for communications on WAN 102. In the preferred embodiment of system 100, LAN/WAN interface 280 includes the software necessary to couple message packets between LU6.2 and TCP/IP protocols for communications between central LAN 110 and casino property LANs 120. In particular, LAN/WAN IF 280 operates in conjunction with transaction management system 216, 216' to provide CMS 234, LMS 238, and EMS 240 with rapid access to customer accounts for all customers who have visited any casino property affiliated with the casino company and obtained a customer ID card. For this purpose, each customer ID card includes a unique ID number that is associated with a customer account in CPDB 220.

In the preferred embodiment of the invention, the RPG applications of CMS 234 are implemented in the AS400 environment of computer 124. In order to facilitate fast, real-time communication between CMS 234 and CPDB 220, a messaging system is implemented as part of interface module 235 of computer 124 and transaction management system 216' of server 112. The messaging system functions as an application program interface (API) that allows the RPG applications of CMS 234 to communicate with CPDB 220 via transaction management system 216, 216', with LAN/WAN interface 280 coupling messages between the different communications protocols.

In the preferred embodiment of system 100, customer data is transferred between LAN 120 and LAN 110 by means of message packets comprising header and data segments, the attributes of which are specified in a data dictionary associated with the messaging system. The data segments reflect the database schema of CPDB 220 and the header segments correspond to user provided service applications (not shown) accessed through transaction management system 216. These user provided service applications implement functions for coupling data to and from CPDB 220 in response to requests from CMS 234. A utility associated with the messaging system reads the data dictionary and defines data structures in the AS400 system environment suitable for passing data between the RPG applications of CMS 234 and the messaging system. A message building/parsing module uses data provided through the defined data structures to build message packets for transmitting requests to transaction management system 216, 216', which directs the request to the appropriate service application. A message building/parsing module associated with the service applications provides analogous services for communications with DBMS 214. The messaging system is described in greater detail below.

As noted above, the optimal architecture for system 100 will be determined in part by the volume of data traffic that WAN 102 can handle, i.e. the "bandwidth" of WAN 102. The embodiment of FIGS. 1, 2A, and 2B, in which each casino LAN 120 includes CMS 234 for handling day to day transactions and communicating data to CPDB 220, balances the advantages of centralized computing systems with the bandwidth limitations of typical WANs 102. Where WAN 102 has sufficient bandwidth to handle real-time data transactions between CPDB 220 and a plurality of casino properties, local CMS 234 at each of the plurality of casino properties may be eliminated in favor of a centralized CMS 234 implemented on central LAN 110.

Figure 2C:
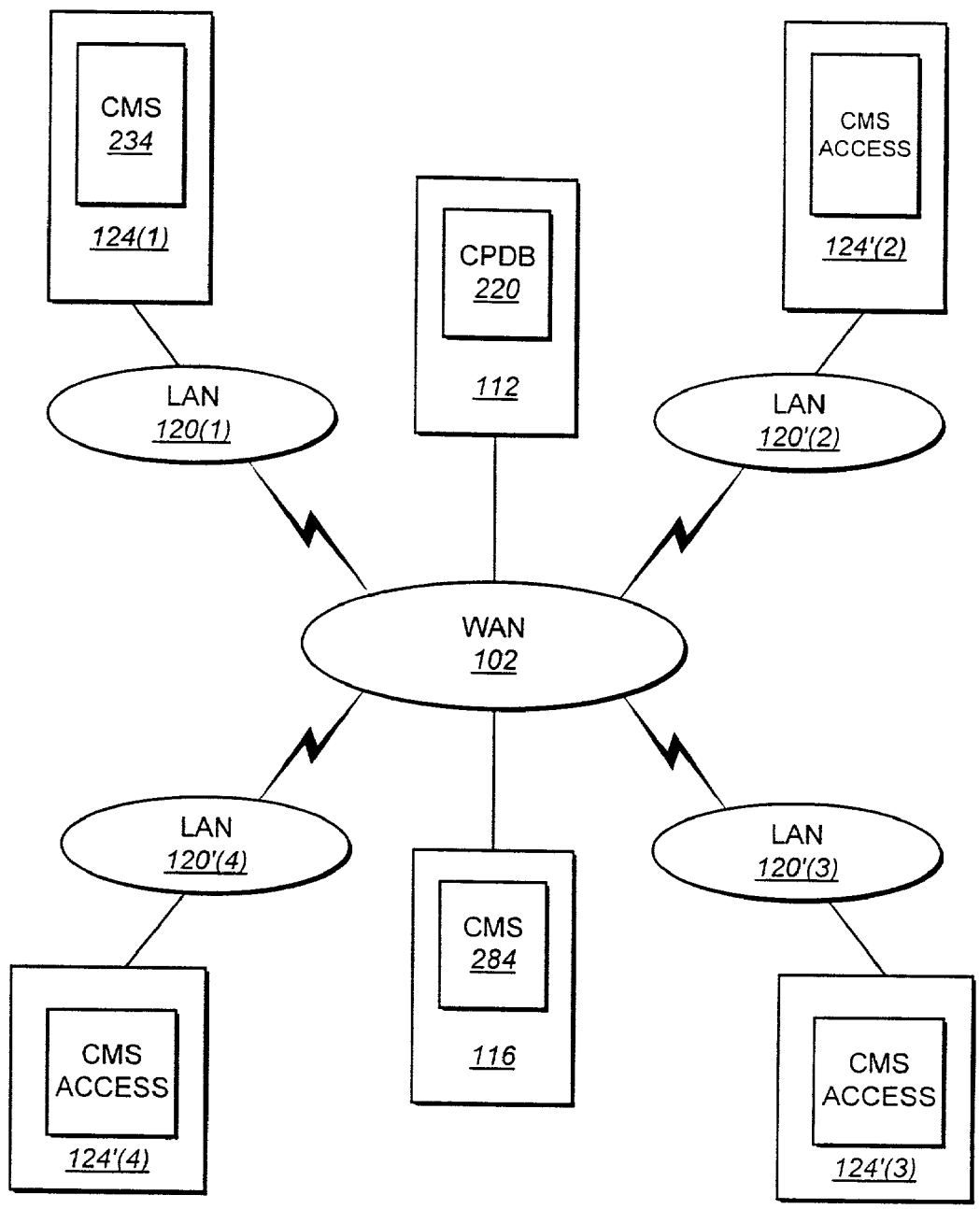

Referring now to FIG. 2C, there is shown a simplified block diagram of an alternative, centralized configuration for system 100. In the configuration of FIG. 2C, local CMSs 234 associated with selected casino LANs 120' have been eliminated in favor of a central CMS 284 supported on server 116 on central LAN 110. In this embodiment of the invention, each casino LAN 120' includes one or more computers 124' for communicating with central CMS 284 over WAN 102. Since computers 124' merely provide access to central CMS 284, they may be workstations or PCs. Central CMS 284 handles day to day transactions for each of casino LANs 120', maintaining a separate data store for each LAN 120' under its management. The data stores of central CMS 284 for LANs 120' are periodically updated to CPDB 220 to maintain the centralized data current. Where the data capacity of WAN 102 is sufficiently, it may be possible to eliminate local CMS 234 from all LANs 120, 120'. Similar hybrid and fully centralized configurations may also be set up for LMS 238 and EMS 240.

Another alternative to the configurations of FIGS. 2A, 2B, and 2C is a fully decentralized configuration in which CPDB 220 is eliminated in favor of a distributed database. This configuration is discussed in greater detail in conjunction with FIG. 5. Unless otherwise indicated, the following discussion assumes system 100 is configured as indicated in FIGS. 2A and 2B.

Figure 3:
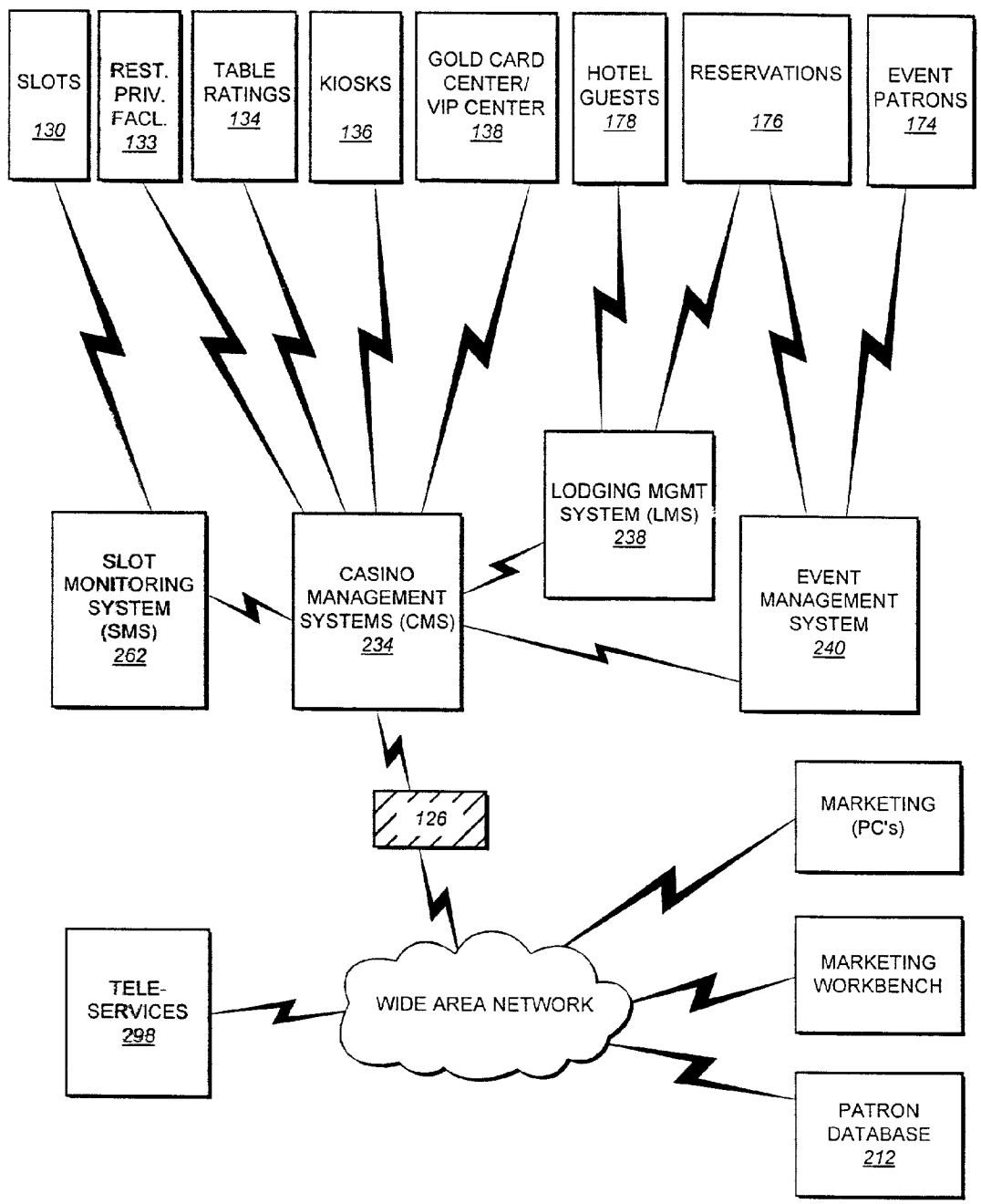
FIG. 3 is an overview of a casino LAN, indicating connections between the various input devices and distributed management systems supported on the casino LAN.

Referring now to FIG. 3, there is shown the embodiment of system 100 including CPDB 220 and local CMS 234, with communications links between different nodes explicitly indicated. In the disclosed embodiment, for example, CMS 234 receives customer activity input directly from gaming tables 134, kiosks 136, and a customer information center 138. CMS 234 also receives customer activity data from slots 130 through SMS 262. Kiosks 136 are terminals located around the casino property that allow customers to check on their activity points or comp availability by inserting their customer ID cards. Customer information center 138 provides services to casino patrons such as membership information and arranging for "comps", as described in detail below. CMS 234 also provides data to each of these input devices. For example, casino employees at gaming tables 134 receive customer data summaries so they can determine whether the customer qualifies for a "comp" or simply greet the customer by name.

LMS 238 receives customer data from a hotel desk 178 and reservations clerks 176 and provides customer account summaries to these locations for use by casino employees. EMS 240 also exchanges customer data with reservations clerks 176 and, in addition, exchanges customer data with events' venues 174.

In the disclosed embodiment, both LMS 238 and EMS 240 communicate with gateway server 126 through CMS 234, and gateway server 126 handles the data translation necessary to communicate with CPDB 220 via WAN 102. This communication topology facilitates searching among different management systems 234, 238, 240 for customer data, but it is not essential to the present invention. The same system could be operated with EMS 240 and LMS 234 communicating with gateway server 126 directly. In addition, where UNIX-based casino, lodging, or event management systems are available, they may communicate directly with WAN 102.

Also shown in FIG. 3 is a teleservices module 298 coupled to CPDB 220 through WAN 102. Teleservices module 298 represents a telephone-based system that allows customers to arrange travel plans at some or all of the affiliated casino properties. By connecting teleservices module 298 to WAN 102, operators can access customer data in CPDB 220 in real-time. This allows operators to determine, for example, whether a customer arranging a trip to one of the affiliated casino properties qualifies for a comp room, a room upgrade, or the like.

Customer accounts in CPDB 220 include detailed information on the customer's preferences, interests, credit rating, win profiles, and accumulated activity points. Win profiles are determined according to gaming data accumulated at any of the casino properties affiliated with the parent company through input devices such as slot machines 130 and dumb terminals 132 associated with gaming tables 134. Activity points are determined in part by gaming activity but may also be augmented by sweepstakes and various other promotional programs. Other customer data relating to non-gaming activity may be tracked through various input devices, including workstations 128, 148 supporting EMS 240 and POS 244, and made available to the marketing department for evaluation and analysis. These features of customer accounts are discussed in greater detail below.

In order to provide rapid access to essential customer data while minimizing data storage requirements for casino properties, each CMS 234 maintains accounts for regular customers in a local data store. With this configuration, CMS 234 accesses CPDB 220 whenever a customer registers activity in any of the casino venues and no customer account data is available locally. For example, when a customer presents his or her membership card to check into the hotel at the casino property, LMS 234 checks with CMS 234 for a local customer account. Currently, LMS 238 does not maintain a local data store, but if expanded to do so, LMS 234 would check its local data store before checking that of CMS 234.

In general, customer data may already be available locally from CMS 234 if the customer has visited the casino property before or if, for instance, a new customer played slot machines 130 before checking in to the hotel. In the first case, static customer data, including the customer's name, address, credit rating and the like, would be maintained in CMS 234 from the previous visits. In the case of a new customer, CMS 234 will have already retrieved a summary of the customer's account data from CPDB 220, as described below, and LMS 238 may access the data from CMS 234.

If the customer data is not available locally, as when a customer new to the casino property checks into the hotel first, LMS 238 will send a data request to CMS 234, which forwards it to CPDB 220 using the messaging system and transaction management system 216, 216'. This transaction is carried out on-line in order to provide rapid access to a summary of basic customer information such as the customer's address, credit status, gaming points, theoretical win profile, and recent trip activity. Ready access to this customer data allows casino employees to make the check-in process both more efficient and more personalized for the customer, enhancing the customer's overall experience and making him or her more likely to return.

Throughout the customer's stay at the casino property, the customer's account will be updated to reflect the customer's activities at the various casino venues. For example, when the customer inserts his or her ID card into a slot machine 130, the ID number is read, the customer's betting activity is monitored, and the account updated to reflect the activity. Similarly, if the customer purchases an event ticket or redeems customer activity points for a meal, workstations 118, 148, respectively, provide the ID number and transaction data to CMS 234, which updates the customer account to reflect the transaction. LAN 120 thus allows all of the customer's activity at the associated casino property to be tracked, which in turn provides a more accurate picture of the customer's value to the casino.

The cross-property nature of system 100 makes the accumulated customer data available at whichever casino property the customer decides to visit. In order to maintain all account data up to date, all data processed by local management systems CMS 234, LMS 238, and EMS 240 is periodically updated to CPDB server 112 in a batch process. This update synchronizes data in all storage locations, i.e. CPDB 220 and local stores associated with CMSs 234, to ensure that employees at any casino property have access to the latest data. When this configuration is employed with a WAN 102 having limited bandwidth, data synchronization is typically done when traffic on WAN 120 is low, in order to minimize any interference with on-line data access transmissions.

Data must also be synchronized in the configuration of FIG. 2C, with central CMS 284 periodically updating CPDB 220 from the data stores associated with LANs 120'. However, data traffic generated by these updates is limited to central LAN 120 and does not impact the data traffic on WAN 120.

The seamless flow of data supported by the present invention reinforces the customer's perception of the national brand associated with the parent company and the activity point system provides additional incentives for the customer to patronize the casino's properties in different locations. In the absence of the method of the present invention, there is no record of the customer's activities at other casino properties and, consequently, there is no opportunity to leverage the data already accumulated on the customer to affirm the corporate links between the properties.

Figure 4:
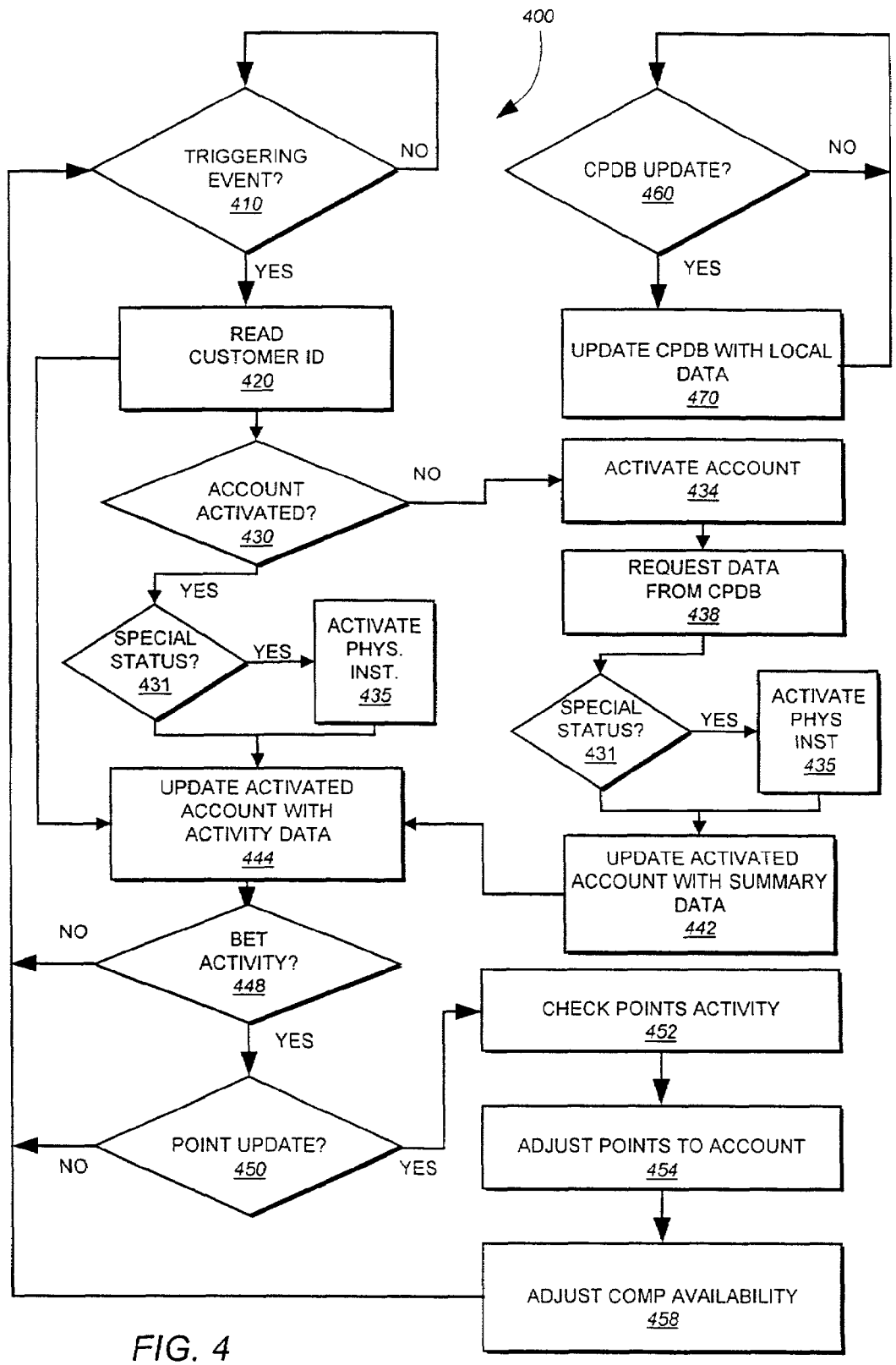
FIG. 4 is a flow chart representing a method for tracking customer activity across all affiliated casino properties in accordance with the present invention.

Referring now to FIG. 4, there is shown a flow chart of method 400 in accordance with the present invention for tracking customer activity data and accumulating activity points across casino properties. For purposes of illustration, the discussion assumes that the customer activity data is being directed to CMS 234, i.e. gaming activity of some sort is being tracked. Method 400 is initiated when a triggering event, such as insertion of an ID card into a slot machine 130 or entry of an ID number or name into a dumb terminal 132 is detected 410. The customer ID number (or name) is read 420 by CMS 234, which determines 430 whether it has already activated the associated customer account. If the account has not yet been activated by CMS 234 at the current casino property, the customer account is activated 434 in CMS 234, a request for summary data from the customer's account is forwarded 438 to CPDB 220, and the activated account is updated 442 with the summary data from CPDB 250. If, on the other hand, it is determined 430 that an account is already activated, the summary data is already available and the customer account is thereafter updated 444 to reflect any new activity.

It is noted that in the centralized configuration of system 100 (FIG. 2C), central CMS 284 maintains data stores for each LAN 120 it handles. Consequently, the checking process described above occurs with centralized CMS 284 as well.

Gaming and non-gaming activities are treated differently, and updates occurring at step 444 typically include non-wagering activities related to gaming. For example, a customer's account may be updated at this point to reflect redemption of activity points, redemption of a comp voucher, or currency or marker transaction (credit advance). In addition, some wagering related data may be updated 444 at this time. For example, the start time of a betting session or the venue at which a wagering activity is occurring may be reflected to the customer's account.

As noted above, activity point awards are based on a number of criteria and these may be adjusted to target different casino properties or venues. At step 448, method 400 determines whether the monitored activity is one for which any points are awarded. In the preferred embodiment of the invention, non-gaming activity, such as hotel and event activity, may be tracked for accounting and marketing purposes. Once non-gaming activity has been reflected in the customer account, method 400 returns to await 410 the next triggering event.

In the current embodiment of the invention, points are awarded for gaming activities, but this may be readily expanded to include point awards for non-gaming activities. With respect to gaming activities, points awards are determined when the activities are completed or an account status is requested. For example, when a customer initially inserts an ID card into a slot machine 130, method 400 will be triggered 410 to record the event. However, the activity points awarded are based in part on how much the customer wagers, and this is not determined until the customer removes his or her card from the slot machine 130 or an update request is received by SMS 262. If the current triggering event is, for example, a card removal or status request, the customer account is updated 450. Otherwise, method 400 returns to step 410 to await the next triggering event. For this reason, SMS 262 (FIGS. 1, 2B) maintains betting data until one of these events trigger it to forward the data to CMS 234 for updating the appropriate customer account.

Referring again to FIG. 4, points are updated 450 when a betting session is completed or an account status requested, and method 400 checks 452 a table to determine the number of points to be awarded. For example, the company may promote a new casino property by awarding bonus points for all gaming activities at the new property, or the casino may award bonus points for gaming at a new venue that is being promoted. In any case, method 400 determines 452 the appropriate point level and adjusts 454 the point tally in the customer's account accordingly.

Betting activity is also reflected 458 in a separate field for purposes of determining a customer's comps. Unlike activity points, comp data is based solely on the historical amount of wagering done by the customer and does not reflect point weighting or other promotional schemes. When any point and comp adjustments have been made, method 400 returns to await 410 the next triggering event.

CPDB updates 460 are required to synchronize data in the embodiment of system 100 employing distributed CMSs 234 and centralized CMS 284 (FIGS. 2A and 2B, and FIG. 2C, respectively). In the former configuration, these updates periodically transfer accumulated data from all accounts in local management systems (typically, CMS 234) to CPDB 220. In the preferred embodiment of this configuration, updates to CPDB 220 are scheduled at least once every twenty four hours at time periods when activities on casino LANs 120, central LAN 110, and WAN 102 are low. Where WAN 102 has a high bandwidth, data updates may be made without regard to other traffic on WAN 102. For the reasons discussed above, CPDB updates from the data store of central CMS 284 do not impact data traffic on WAN 102 and may be scheduled more flexibly.

Method 400 balances the casino company's need for rapid on-line access to customer information from all of its casino properties with the personnel and monetary costs of maintaining multiple large databases. Instead of duplicating all customer accounts at all casino properties, copies of a customer's account are maintained only on central database server 112 and in data stores of CMS 234, CMS 284 associated with those casino properties visited by the customer. On the other hand, the data is available from central database server 112 whenever it is requested by another casino property. In the preferred embodiment of the invention, static customer data is maintained on local CMS 234 for a period of between six months and two years, depending on each casino's policy. If no activity is registered by a customer during this period, the local account may be purged.

Computer system 100 and method 400 provide the infrastructure for a national customer recognition program for attracting and retaining customers. They also provide the raw customer data on which the casino company can base its marketing decisions and through which the company can launch new marketing programs.

Customer recognition awards may be based on different subsets of customer data accumulated through and stored on system 100. The customer recognition program based on activity points has already been mentioned. A customer accumulates points in his or her customer account according to his or her activity at all venues of all casino properties and according to any promotions currently being run by the casino or its parent company. The accumulated points represent a monetary value associated with the customer's activities and may be used in place of cash within any of the affiliated casinos. Thus, in addition to the already noted benefits of the point system, it contributes to the establishment of a cashless, paperless business environment.

In order to provide an incentive for customers to accumulate points, points may be earned at any casino property affiliated with the company. The cross-property nature of point accumulation encourages customers to visit casino properties affiliated with the parent company when they travel, since this activity contributes to their rewards no matter which casino property is the source of the points. Point awards may be structured in a variety of ways to target specific activities. For example, bonus points may be awarded to customers who visit at least two affiliated casino properties within a given time period. Point awards may also be based on a tiered system, under which customers accumulate points for their gaming activities at rates that increase as their point totals increase. In general, point awards may be instituted for different time periods and for different properties, according to the marketing goals of the casino and the parent company.

Accumulated points may also be redeemed at any casino property affiliated with the casino company. Using system 100, a casino employee can call up data indicating the accumulated points of any casino customer, regardless of the property at which the points were earned and regardless of whether the customer is a regular at the casino property. For example, a customer who has been accumulating points through regular visits to a Las Vegas casino can visit an affiliated casino in New Jersey and redeem his or her accumulated points for goods or services at the New Jersey casino.

Point awards also encourage customers to use their ID numbers at any of casino venues of the affiliated casino properties that offer customer tracking. This enhances customers' interest in participating in tracking programs and provides the casino company with more data on which to base its marketing decisions. Thus, the point system can be used to both recognize customers for their patronage and to market different facilities of the company.

Comping is another customer recognition program that is supported by system 100 and method 400. Comps are awarded to a customer according to the customer's average daily theoretical win, which is an estimate of the casino's average daily winnings from the customer. The level of comps available to a customer is based on the casino's theoretical win from different gambling activities and the customer's historic level of these gambling activities. For example, on average a casino will win a statistically determinable amount of money, i.e. the theoretical win, from a customer who bets an average of $5000 per trip on blackjack. If the customer's theoretical win profile is large enough, the casino may "comp" the customer a free night's lodging, allowing the customer an additional day of gaming. Customer betting activity accumulated by system 100 is crucial to comping customers at a level commensurate with their expenditures, since it provides the raw data on the customer's betting activity.

Casino employees have some discretion in awarding comps and the practice may vary from one casino property to another. System 100 helps eliminate some of the vagaries introduced by the discretionary nature of comping by providing the same customer data to employees at all casino properties visited by a customer. This ensures that comping decisions will at least be based on consistent estimates of the customer's average theoretical win profile. Regular customers at one casino property of the company who visit a new casino property of the company are more likely to be "comped" at a level consistent with their play at their regular casino property. The national character of the present tracking system also means that the average daily wager figure will include a larger number of data points, since the customer's gaming activities at all casino properties are included. Estimates based on this data should be that much more accurate.

Customer data accumulated by system 100 is also used in tracking customer offers to determine the validity of outstanding offers and the profitability of those offers for the casino. These offers can be entered into a customer's account to indicate their availability to the customer, and the customer's account can be updated as necessary when an offer is redeemed. In addition, data accumulated in CPDB 220 during the visit in which the customer redeems the offer can be used to determine whether or not it is profitable for the casino to repeat the offer or make additional offers. For example, the casino may send to selected customers offers for a free nights lodging at one of its properties if the customer stays for at least two nights. In certain cases, the customer's incremental expenditures for the extra day's stay may not justify repeating the offer to that customer. Information gathered on customer activity associated with an offer may also allow the marketing department to better target their offers.

Figure 5:
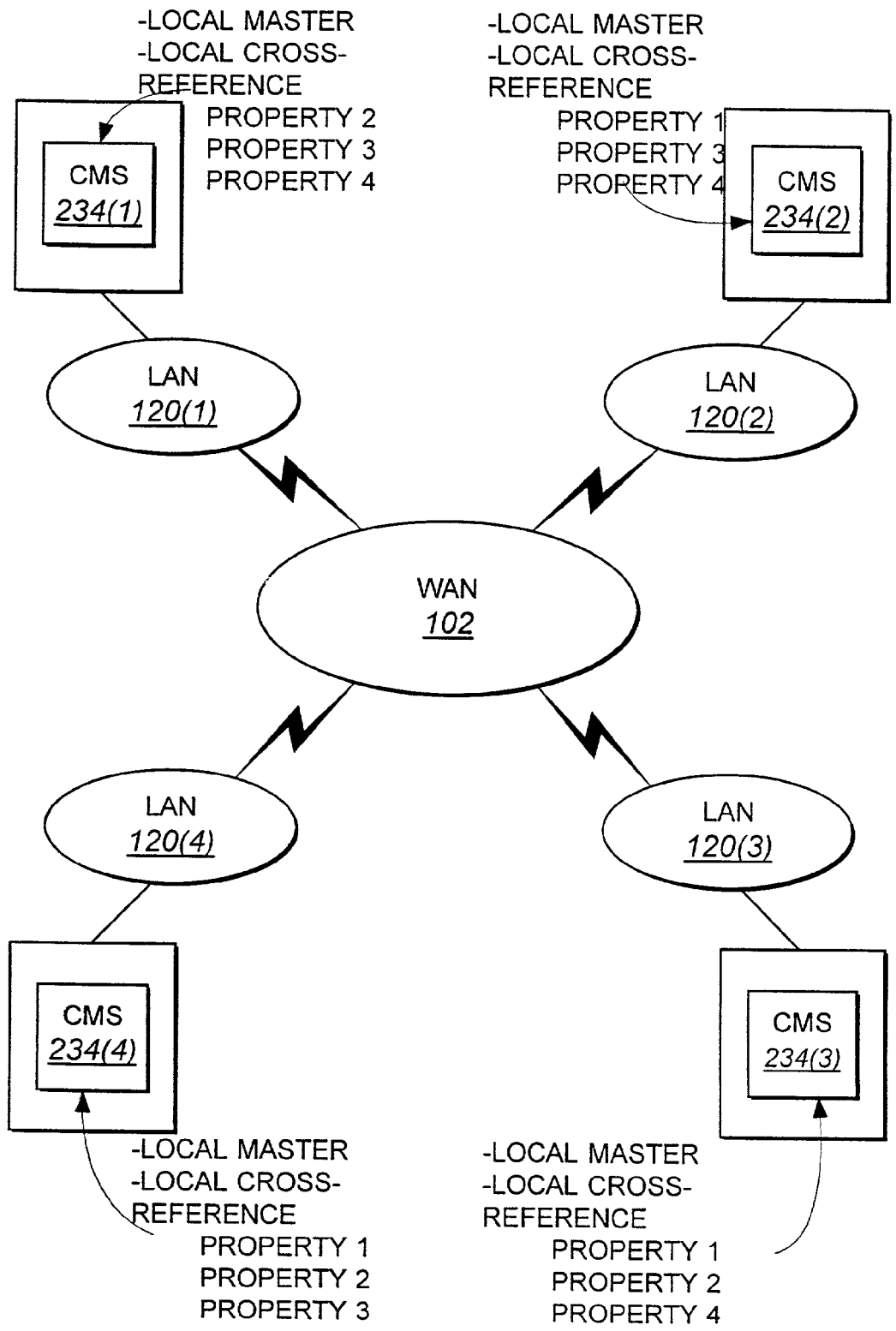
FIG. 5 is a block diagram of the system modules supported on casino LANs where a distributed patron database and management systems are employed.

Referring now to FIG. 5, there is shown a simplified block diagram of an alternative embodiment of system 100, in which both management system processing and database operations are distributed among LANs 120. This embodiment is illustrated using four LANs 120(1)-120(4) coupled to WAN 102, but the number of LANs 120 may be greater or less than this.

LANs 120(1)-120(4) include local CMS 234(1)-234(4), respectively, each of which has an associated local data store. The local data stores of CMS 234(1)-234(4) form the distributed database for this embodiment of the present invention. Each local data store comprises a local guest master list for the corresponding casino property and a local cross-reference list that includes selected customer data from every other affiliated casino property. For example, the local guest master list of CMS 234(1) comprises data for all casino customers who received their identity cards at the associated casino property (property 1). The local cross-reference list of CMS 234(1) includes data sections for properties 2, 3, and 4, which comprise customer data for any customer that received their identity card at property 2, 3, or 4, respectively, and subsequently visited property 1. CMS 234(1) also includes virtual files 2, 3, and 4 for properties 2, 3, and 4, respectively, through which data on customers who are not listed in either the local master list or local cross-reference list may be accessed. In effect, virtual files 2, 3, 4 on CMS 234(1) represent local master lists residing on CMS 234(2), CMS 234(3), and CMS 234(4), respectively, that are accessed by CMS 234(1) through WAN 102.

In this embodiment of the invention, a customer of a casino is assigned an identification number including a property field that indicates the casino at which the customer's account originated, i.e. where the card was issued. When a customer of property 1 uses his or her card at property 1, the property field indicates to CMS 234(1) that the customer's account data is accessible through the local master list of CMS 234(1). On the other hand, when this customer visits property 3, the property field signals that CMS 234(3) should check the data segment associated with property 1 in the local cross-reference list for the customer's account. If it is the customer's first visit to property 3, there will be no account data in the property 1 data segment of the local cross-reference list and CMS 234(3) will use virtual file 1 to access the local master list of CMS 234(1). When the data is retrieved from CMS 234(1), it is stored in the property 1 data segment of the local cross-reference list of CMS 234(3), where it is updated with the customer's activity during his or her visit to property 3.

In the system of FIG. 5, where a distributed database configuration is employed, data synchronization is particularly important to ensure that all activity data, including points and comp availability, is reflected in a customer's account and is available at any of the affiliated casino properties. For example, when a customer from property 1 visits property 3, the data on the customer's activity at property 3 is added to his or her account in the property 1 segment of the local cross reference list of CMS 234(3). Data synchronization ensures that this new data, including points or comps that are earned or redeemed during the visit, is available when the customer visits any other property. Synchronization may be accomplished in a number of ways. For example, the customer's accounts at each casino property may be periodically updated to reflect any activity recorded by the customer at any of the affiliated properties, so that each property visited by the customer has a complete set of the latest data.

Alternatively, all changes to a customer's account on any guest master list may be periodically updated to the customer's principal account, i.e. the account at the issuing property. In this case, each visit to a different property requires updating of the customer account on the guest master list with the account data from the customer's principal account. Provided these or similar procedures are implemented to ensure the coherency of the distributed database, the point and comp system may be implemented in the manner described above.

There has thus been disclosed a system and method for collecting customer data across all of the casino properties of a company, accumulating the collected data in a patron database, and making the accumulated data available at any casino property when triggered by a customer visit to the casino property. The system provides an infrastructure for implementing across all affiliated casino properties a point system that rewards customers for the gaming activities and allows targeting of different casino properties and venues for marketing purposes. The system also makes available to casino employees the same customer data, independent of which casino property the customer visits regularly. This allows customers to receive personalized service and to be rewarded in accordance with their value to the casino even when visiting new casino properties.

Referring generally now to FIGS. 6-12 there is shown an embodiment of the messaging system employed in the preferred embodiment of computer system 100 (FIG. 1). A numbering scheme is employed in FIGS. 6-12 which is different from that employed in the foregoing portion of the specification and in FIGS. 1-5. Correspondence between different elements may be determined from Table A1, below. In addition, corresponding elements serving comparable functions in FIGS. 1-5 and in FIGS. 6-12 are also indicated in Table A1.

TABLE A1

| FIGS. 1-5 | FIGS. 6-12 |
|---|---|
| transaction management system 116, 116' | transaction management system 150, 150' |
| gateway server 126 | gateway server 152 |
| database server 112 | open system server 192 |
| computer 124 | computer 112 |

TABLE A1-continued

| FIGS. 1-5 | FIGS. 6-12 |
| --- | --- |
| DBMS 214 | DBMS 380 |
| CPDB 220 | DB 290 |
| LAN/WAN IF 280 | network services 140, IA 142 |
| TCP/IP | protocol module 160 |
| SNA LU6.2 | protocol module 130 |

Figure 6:
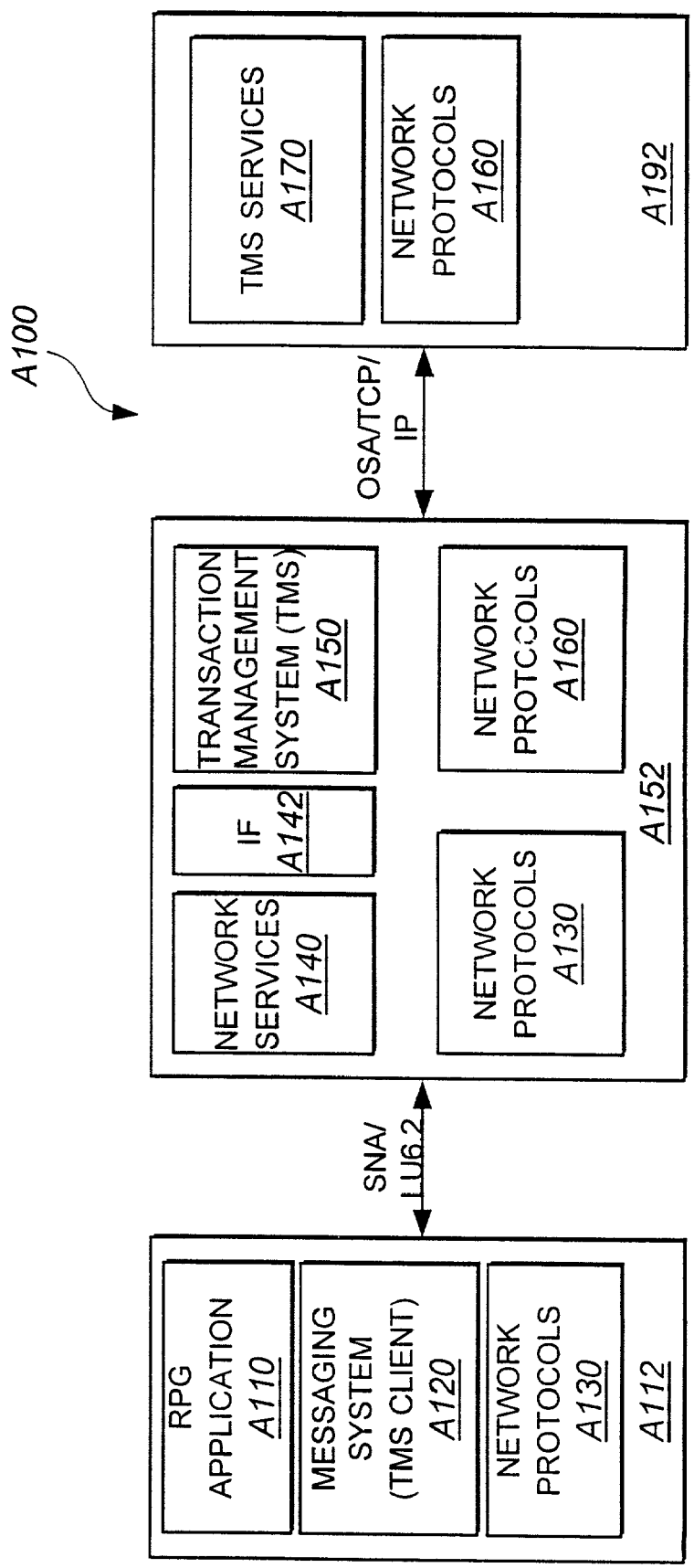
FIG. 6 is a block diagram of a network system incorporating a messaging system in accordance with the present invention.

Referring first to FIG. 6, there is shown a block diagram of a networked computer system A100 that includes a messaging system A120 for communications between application programs on proprietary and open system platforms. Computer system A100 comprises a first computer A112 based on a proprietary system architecture, a server A192 based on an open system architecture, and a gateway server A152 for connecting the different system architectures. The proprietary system architecture of first computer A112 is represented by network protocol A130, and the open system architecture of server A192 is represented by network protocol A160. In the disclosed embodiment of system A100, the open system architecture is UNX, Windows, or the like, the network protocol A160 is TCP/IP, the proprietary system architecture is IBM's System Network Architecture (SNA), and network protocol A130 is IBM's SNA LU6.2.

First computer A112 includes an RPG application A110, messaging system A120, and network protocol A130. Messaging system A120 acts as an application program interface (API) between RPG application A110 and a transaction management system A150 on gateway server 152. Transaction management system 150, in turn, provides access to transaction services A170 on open system server 192. Transaction services 170 represents the different services that may be accessed by RPG application A110 and the means for accessing these services.

Gateway server A152 includes a network services module A140, transaction management system A150, and an interface module A142. When triggered by messaging system A120, network service module A140 allocates a conversation between messaging system A120 and transaction management system A150 by means of interface module A142. A conversation is a logical connection that allows communications between applications on different nodes to proceed, while hiding the details of the underlying communication protocol from the communicating applications. In the disclosed embodiment, the allocated conversation carries message packets between messaging system A120 and transaction management system A150 using network protocol 130. The communication link between RPG application A110 and transaction services A170 is completed by a dialogue between transaction management system A150 and transaction services A170 based on network protocol 160. The message packets generated by messaging system A120 include parameters, i.e. data and control information, necessary to activate one of transaction services A170, carry on communications with the activated service, and terminate it.

Figure 8:
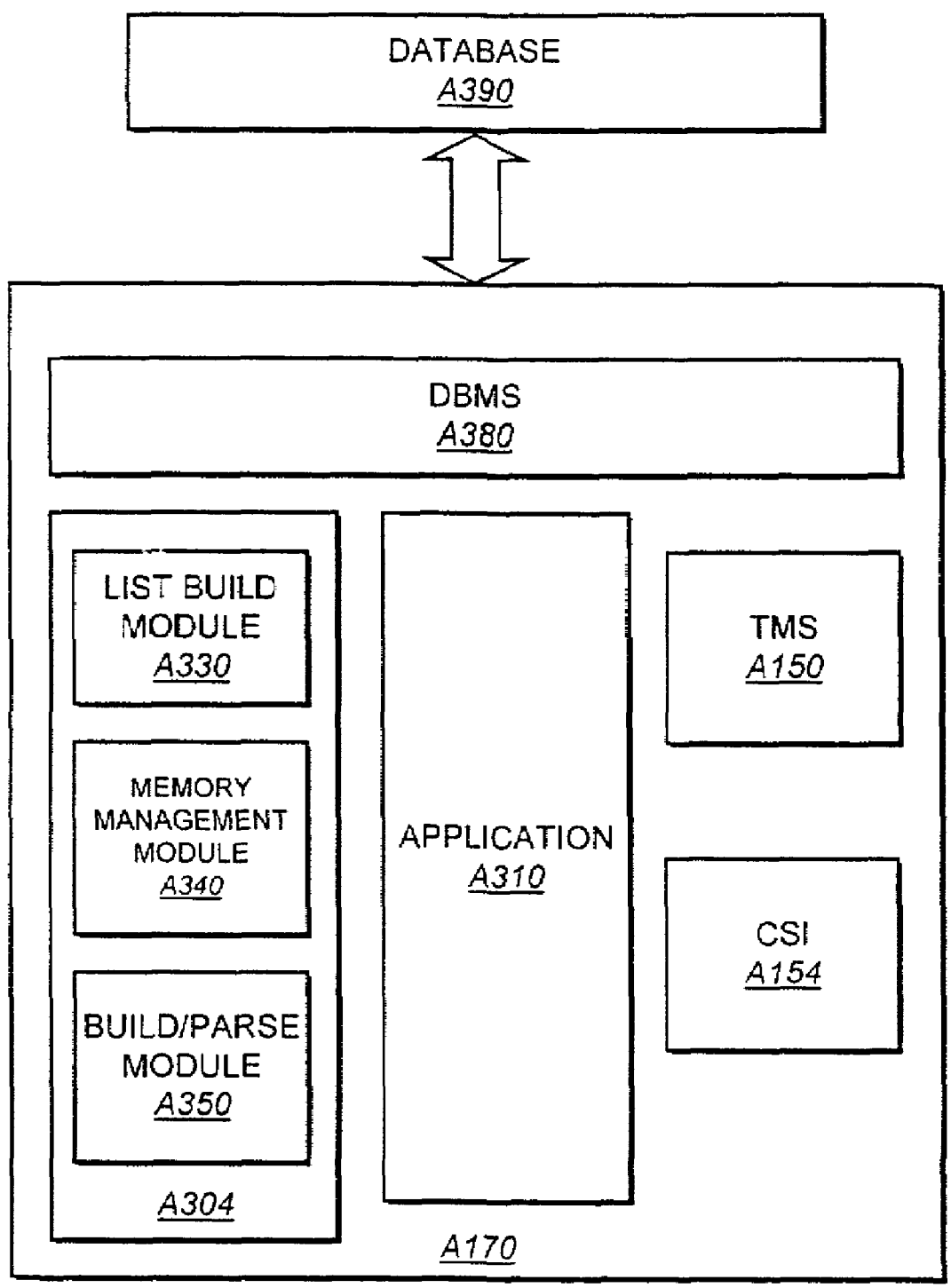
FIG. 8 is a block diagram of the components of a service application supported by transaction services of the open system network.

Referring now to FIG. 8, there is a block diagram of a transaction service A170, which comprises an instance of transaction management system A150, including a client-server interface (CSI) A154, a service application A310, a message conversion system A304, and a database management system (DBMS) A380. Service application A310 is a user provided module that includes functions for accessing data from DB A390 through DBMS A280. In the disclosed embodiment, DBMS A380 is Informix 7.0, and transaction management system A150 is AT&T's TOP END, both of which conform to the X/Open distributed transaction processing (DTP) XA interface. Transaction management system A150 also conforms to the DTP TX interface for communications with service application A310.

Figure 7:
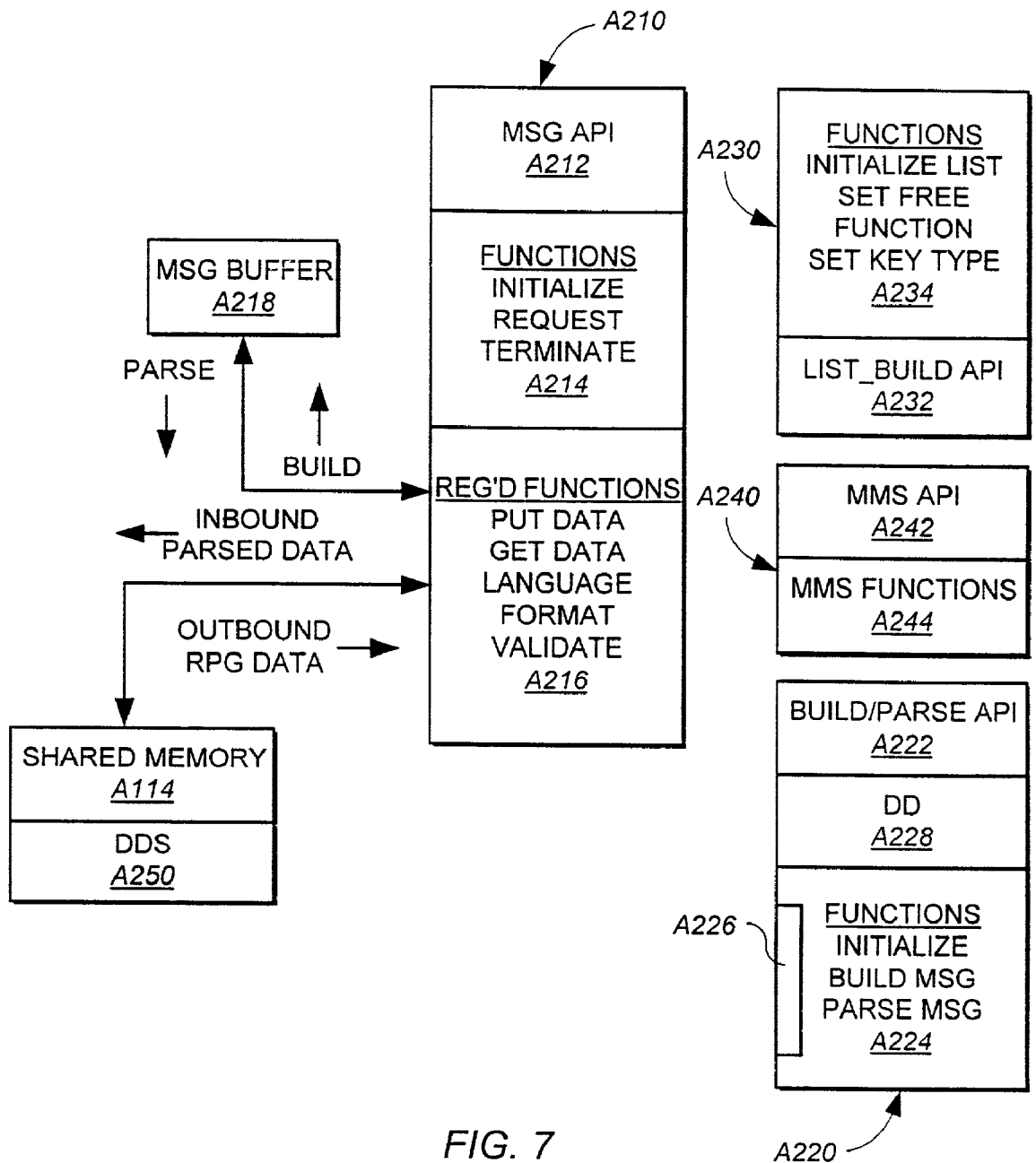
FIG. 7 is a block diagram of the messaging system for the network system shown in FIG. 6.

Referring now to FIG. 7, there is shown a block diagram of messaging system A120 comprising a MSG module A210, a MSG Build/Parse module A220, a List_Build module A230, a memory management module A240, an inbound/outbound message buffer A218, and defined data structures A250 for coupling data between messaging system A120 and RPG application A110. In order to make messaging system A120 portable between platforms, component modules A210, A220, A230, and A240 are written in C programming language.

MSG module A210 includes a MSG API A212 through which RPG application A110 accesses functions A214 for initiating and terminating conversations with transaction management system A150 and for requesting transaction processing services from server applications A310 accessed through transaction management system A150. In the disclosed embodiment, MSG module A210 also includes registered functions A216, which manipulate data between defined data structures A250 and MSG buffer A218 as described below.

Build/Parse module A220 comprises a Build/Parse API A222, a data dictionary (DD) A228, message building/parsing functions A224, and a registered function (RF) API A226. Build/Parse API A222 provides MSG module A210 with access to platform independent message building/parsing functions A224. DD A228 specifies the fields and field attributes of data segments that are recognized by an open system resource being accessed by RPG application A110. As discussed in greater detail below, DD A228 contributes to the flexibility of messaging system A120, by providing a mechanism for altering its message building capabilities without requiring recoding of RPG application A110 or server applications A310.

RF API A226 provides Parse/build module A220 with access to registered functions A216, which manipulate RPG data in defined data structures A250. Registered functions A216 are specific to the data types of a platform, and including registered functions A216 in MSG module A210 removes any platform-dependence from Build/Parse module A220. For example, a substantially identical build/parse module A322 (FIG. 11) is employed by server application A310 on the open system platform. Build/Parse module A320 parses request message packets from RPG application A110 and builds response message packets to RPG application A100.

List_build module A230 and MMS module A240 provides linked list building and memory allocation functions, respectively, for MSG module A210 and Build/Parse module A220. For example, when RPG application A110 is initialized, it identifies to MSG module A210 all defined data structures it employs. MSG module A210 checks that the defined data structures have the proper number of parameters and calls List_build module A230 to generate a linked list of pointers to the defined data structures. List build module calls on MMS module A240 as needed to allocate memory for the linked list. List build module A230 and MMS module A240 are also used by MSG module A210 to eliminate the linked list when RPG application A110 is terminated.

Typical service applications A310 provide RPG application A110 with functions for searching and writing data to database A390 (FIG. 8). In order for RPG application A110 to communicate with database A390, messaging system A120 must employ in its data packets, data having attributes consistent with the columns of database A390. Since RPG application A110 is the ultimate source of data, messaging system A120 must include some means of ensuring consistency between the attributes of the data segments employed by RPG application A110 and those of database A390. This is the function of defined data structures A250 and DDs A228, A328.

Messaging system A120 provides utilities for generating DD A228 and DD A328 (FIG. 11) and defined data structures A250 from a single source that includes attribute definitions consistent with those of database A390. This ensures that messaging system A120 and service application A310 support the same vocabulary, which in turn ensures that RPG application A110 and database A390 can communicate. The single source from which DDs A238, A328 and defined data structures A250 are generated is ASCII definition file (ADF) A260.

Figure 9:
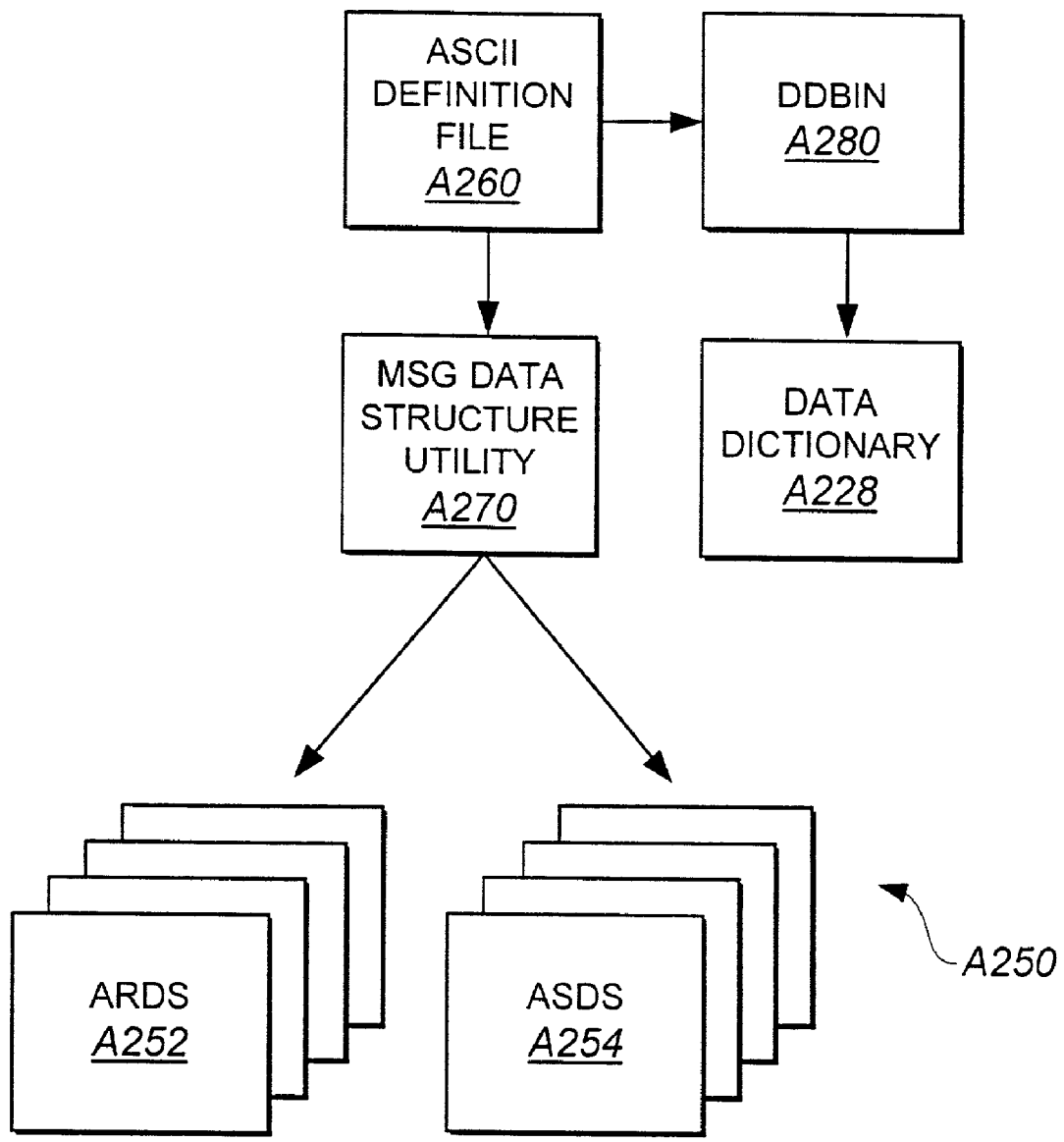
FIG. 9 is a block diagram showing the relationship between the ASCII Definition File and the defined data structures and data dictionaries generated from the ASCII Definition File.

Referring now to FIG. 9, there is shown a block diagram indicating the relationship among ADF A260, DDs A228, A328, and defined data structures A250. ADF A260 is a human-readable file that includes descriptions of the attributes of every field of every data segment in the system. As noted above, the attributes of a segment correspond to the columns (attributes) of the database A390. ADF A260 also includes a header segments, which are used to indicate which service application A310 is being requested by RPG application A110. Header segments include control information for error codes and messages, and those header segments associated with service applications A310 that require data input from RPG application A110, have appended the data segments corresponding to the required data. ADF A260 also includes a list of restricted segments, which are segments that may only be used by selected service applications A310. ADF A260 is typically generated through a GUI design tool, which in the preferred embodiment of the invention, is Visual Builder Tool (VBT). In essence, ADF A260 specifies the vocabulary understood by database A390.

Also shown in FIG. 9 is a Data_Structure Utility (DSU) A270 which is used to generate defined data structures A250 from ADF A260 whenever ADF A260 has been modified. In particular, DSU A270 reads ADF A260 and uses List_Build module A230 to generate a linked list of fields and a linked list of segments from the entries in ADF A260. For every segment in the segment linked list, DSU A270 retrieves attributes of the component fields from the field linked list and writes the information to a DDS A250. Defined data structures A250 are then written to a file, which is linked to RPG application A110 and messaging system A120 as an externally defined data structure.

There are two defined data structures for each data segment defined in ADF A260. Application request data structures (ARDS) A252 are loaded with data by RPG application A110 to provide messaging system A120 with the data it needs to a build a message to a service application A310. Application response data structures (ASDS) A254 are written by messaging system A120 to communicate a response from service application A310 to RPG application A110, following parsing by Build/Parse module A220. A single application control data structure (ACDS) A256 is used by RPG application A110 to communicate service application requests to messaging system A120.

Also shown in FIG. 9 is a utility, DDBIN A280, that reads ADF A260 and generates DD A228 as a binary file sorted by segment names. DDBIN A280 also creates a summary information field for DD A228, including the total number of segments, offsets into DD A228 for alphabetically sorted segments groups, and an offset into the file for a restricted segment file (RSF). DD A228 may be linked into Build/Parse module A220 as an include file. Alternatively, the contents of DD A228 may be read into a segment cache A325 (FIG. 11) associated with Build/Parse module A220, as needed, to facilitate access to segment information. This latter alternative is employed in messaging conversion module A304 (FIG. 8) which is used for message packet building/parsing by service application A310.

Figure 10:
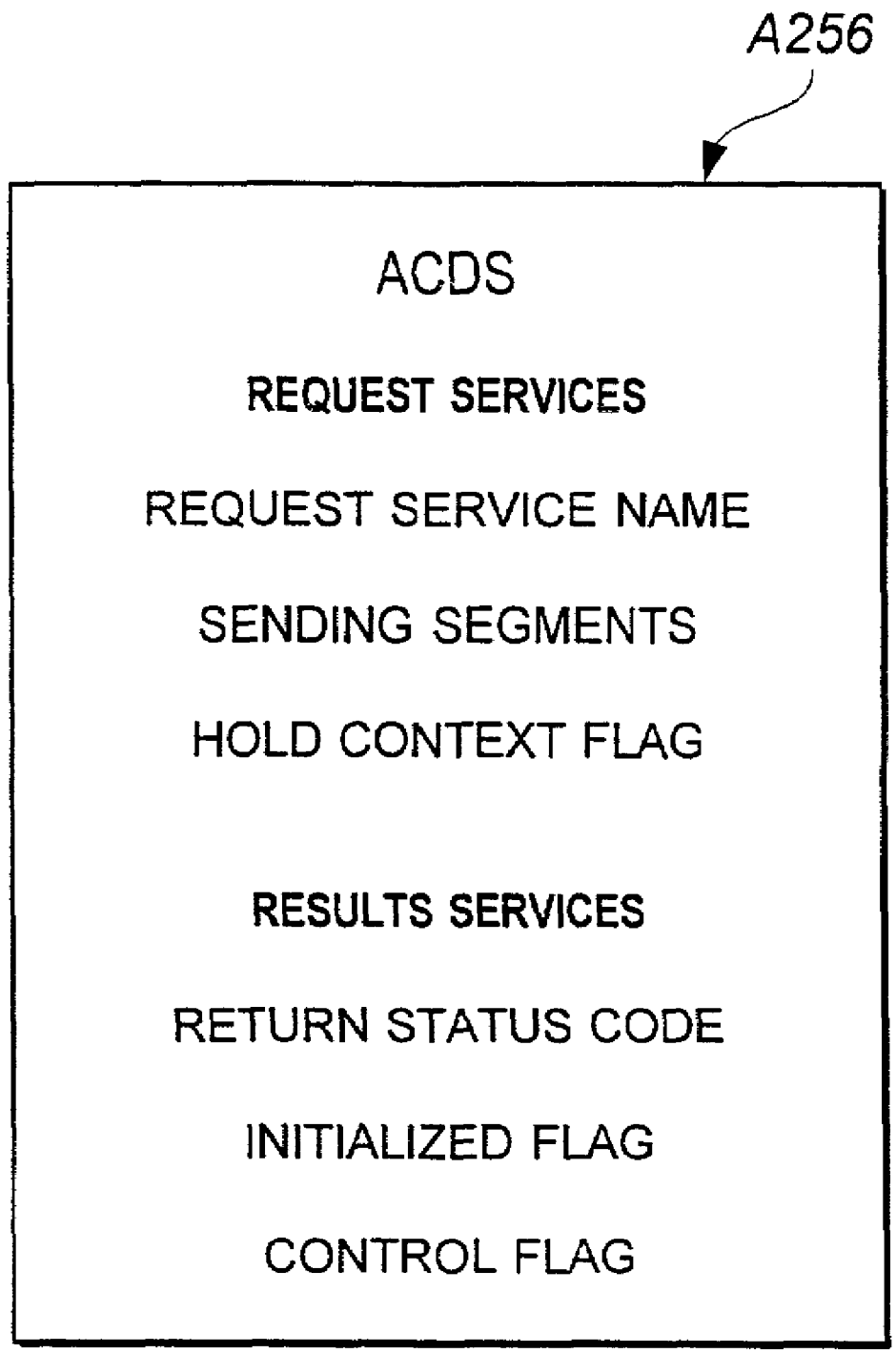
FIG. 10 is a representation of an ACDS defined data structure for communications between an RPG application and the messaging system of the present invention.

Referring now to FIG. 10, there is shown a representation of an ACDS A256 that is used by RPG A110 to request services of messaging system A120. ACDS A256 is also used by messaging system A120 to provide information on the status of requested services to RPG application A110. A single ACDS A256 is used by RPG application A110 to indicate which of transaction services A160 is being requested. Details of the requested service are provided in the following fields of ACDS A256: (1) Request Service Name, (2) Sending Segments, and (3) Hold Context Flag.

Request Service Name is a field in which the name of a service application A310 available through transaction management system A150 is specified. A corresponding header segment defined in ADF A260 is used by messaging system A120 to indicate to transaction management system A150 the type of service being requested. As noted above, some service applications A310 require that RPG application A110 provide data along with the service request. In these cases, the Sending Segments field is used by RPG application to specify which ARDs A252, if any, contain the required data. Each such ARDS A252 is specified in the Sending Segments field by the Segment Name of the data it contains. In the preferred embodiment of the invention, the name of each data segment to be sent is concatenated and delimited by a pipe ("|"). Fox example, where data from three ARDs A252 corresponding to a name (NAME), business address (BUS), and home address (HOME) will be sent to service application A310 specified by ACDS A256, the Sending Segments field will be NAME|BUS|HOME. Data provided in response to a service request is sent from service application A310 to messaging system A120 as data segments. Messaging system A120 makes any necessary data conversions and forwards the converted data segments to RPG application A110 using the corresponding ASDSs A254.

Hold Context Flag is set when RPG application A110 will retain an on-going conversation with a service application A310 as, for example, when RPG application A110 will submit sequential service calls to service application A310.

The Results Services fields of ACDS A256 comprises Return Status Code, Initialized Flag, and Control Flag fields. Messaging system A120 uses these to indicate to RPG application A110 the status of a service request. Return Status Code is zero, unless an error has occurred in the Service Request. Initialized Flag is set when messaging system A120 is properly initialized and is zero otherwise. Control Flag indicates the status of messaging system A120. It is zero by default, four when a service application A310 is currently holding context, and some non-zero value other than four when a failure occurs in messaging system A120.

The interactions between RPG application A110 and messaging system A120 will now be described from initialization through termination of RPG application A110. As noted above, messaging system A120 is initialized through a function call from RPG application A110 during its initialization. The initializing function call includes a parameter list specifying the segment name, segment address, and number of occurrences of each ARDS A252 and ASDS A254 used by RPG application A110 to send data to and receive data from MSG module A210. The parameter list also specifies the name and address of ACDS A256 used by RPG application A110 to communicate control information to MSG module A210. Addresses for ARDS A252, ASDS A254, and ACDS A256 (collectively, DDSs A250) are in shared memory location A114.

On initialization, MSG module A210 first checks that DDs A250 are specified properly (3 parameters for each ARDS A252 and ASDS A254 and 2 parameters for ACDS A256). MSG module A210 then calls initializing functions in Build/Parse module A220, List_build module A230, and MMS module A240, initializes a conversation with transaction management system A150 via network services A140 and IF A142, and waits for a verification message that the conversation has been established. At this time, transaction management system A150 establishes a dialogue with transaction services A160 on open system server A192. MSG module A210 then calls List_build module A230 to generate a linked list of pointers to DDSs A250, and List_Build module A230 calls MMS module A240 as needed to allocate memory for the linked list.

Once conversation/dialogue links have been established between messaging system A120 and transaction management system A150, RPG application A110 accesses a requested service application A310 of transaction services A160 through transaction management system A150, using messaging system A120 as an application program interface (API). RPG application A110 initiates a request for services by loading the Request Service Name and Sending Segments List fields of ACDS A256 with the segment name of the service being requested and the segment names of any data being sent to the requested service. RPG application A110 also loads each ARDS A252 named on the Sending Segments List with the data to be sent.

When ARDSs A252 and ACDS A256 are loaded, RPG application A110 calls the request function in MSG module A210, including the names of ACDS A256 and ARDS A252 in a parameter list associated with the function call. MSG module A210 use the request function to clear the Results Services fields of ACDS A256 and read the Request Service Names and Sending Segments List fields of ACDS A256. MSG module A210 writes a control/status header (see below) to message buffer A118, specifying Request Service Name, a user identification (userid), and status data for transaction management system A150. MSG module A210 also calls the Build MSG function in Build/Parse module A220 with the parameter list specifying the names of the data segments and the location of the message buffer A218.

Build/Parse module A220 handles the conversion and manipulation of data between the DDSs A250 identified in the parameter list and message buffer A218. As noted above, the Build/Parse MSG functions of module A220 use registered functions A216 to accomplish the actual data manipulation between DDSs A250 and message buffer A218. For outbound messages, the Build MSG function uses DD A228 to determine the required form for each segment to be included in the message packet and makes the necessary format conversions. DD A228 is also used on inbound message packets to convert data to a format appropriate to the operating system of the AS/400. The addresses of DDSs A250 are determined from the link list generated on initialization.

The message packet generated by messaging system A120 has the following form:

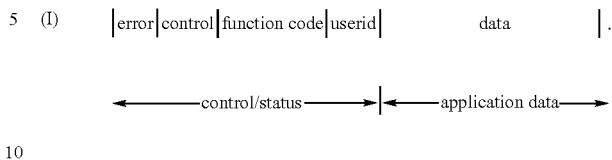

The header, comprising error, control, function code, and userid fields, provides the routing and status information necessary to transfer the service request and associated data of RPG application A110 from messaging system A120 to requested service application A310. In particular, the error field includes error codes for tracking purposes, the control field specifies the status of communications with transaction management system A150, the function code field specifies which service application A310 is being requested, and for security checking purposes, userid identifies the person(s) using RPG application A110. The data field comprises the service name and any application data, suitably formatted, that is being transferred between RPG application A110 and service application A310. As discussed above, this data is loaded by messaging system A120 using Parse/Build module A220.

Once the message packet has been completed, MSG module A210 calls a send/receive function to forward message packet to transaction management system A150 in gateway server A152, using the conversation allocated on initialization. Interface module A142 maps the conversation to the dialogue established between transaction management system A150 and transaction services A160, determines from the function code in the header of message packet (I) which service application A310 is targeted, and uses transaction management system A150 to call targeted service application A310.

Figure 11:
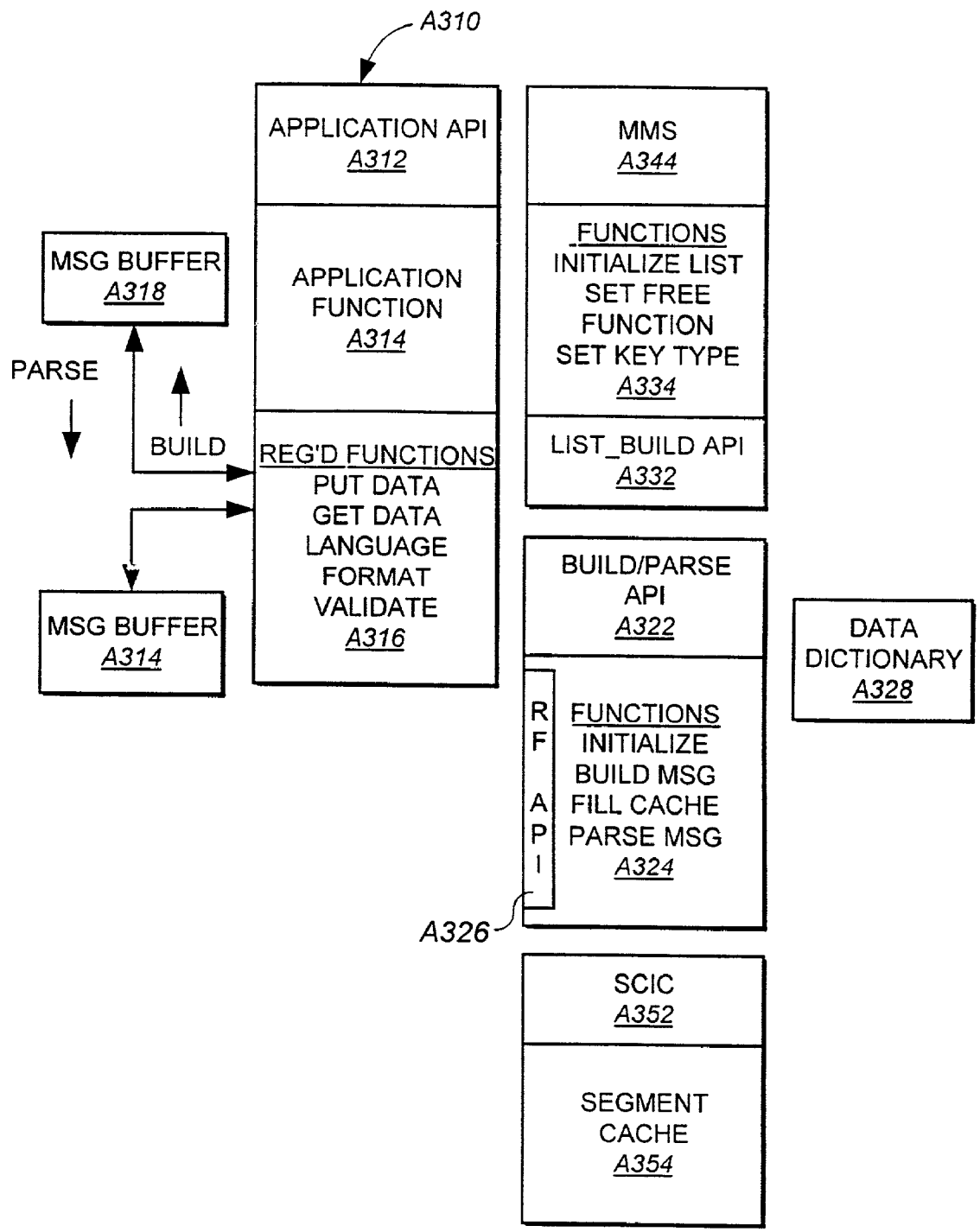
FIG. 11 is a more detailed block diagram of the service application of FIG. 8.

Referring now to FIG. 11, there is shown a detailed block diagram of message conversion module A304 comprising a message build/parse module A320, a list_build module A330, and a memory management system (MMS) module A340, which perform functions for the open system platform of server A192 that build/parse module A220, list_build module A230, and MMS module A240 perform on the proprietary platform of AS/400 A112. In the case of server A192, however, transaction management system A150 operates in conjunction with CSI A154 to handle routing and control information. In particular, these components ensure that the data portion of message packet (I) is routed to service application A310. Consequently, these is no need for a counterpart of MSG module A210 on server A192. On the other hand, the data portion of message packet (I) must be converted into a format suitable for the open system platform, and this is the function performed by modules A320, A330, A340.

As indicated in FIG. 11, service application A310 has associated registered functions A316 that isolate platform-independent, build/parse module A320 from platform specific message (MSG) buffers A314, A318. In this case, MSG buffer A214 includes data structures for coupling data between message conversion module A304 and DBMS A380 in a format consistent with that of database A390. MSG buffer A218 provides a buffering function for message packets inbound from transaction management system A150 and outbound to transaction management system A150. List_build module A330 and MMS A340 also provide essentially the same functions as their counterpart modules A230, A240 on AS/400 A112.

Message conversion module A304 also differs from messaging system A120 in that it uses a segment cache A354 and a segment cache interface structure (SCIS) A352 to facilitate access to the information data dictionary (DD) A326 without including the entire file in Build/parse module A220. SCIS A352 includes information for tracking accessed data segments in segment cache A354. This is an alternative configuration to that employed on AS/400 A112, but it requires sufficient memory for segment cache A354.

While the configuration of computer system A100 shown in FIG. 6 provides the necessary communication between an RPG application A110 and transaction services A170, it does not provide security or accounting functions where transaction management system A150 is TOP END (TE) and IF A142 is an inbound agent (IA) spawned by network services module A140 when messaging system A120 is initialized. In particular, IA A142 is configured to map all conversations/dialogues having the same transaction program name (TE sign-on name) and transaction code (Request Service Name) to a generic userid. Consequently, all users of a given service application 310 will be assigned the same userid, independent of which user(s) of RPG application A110 actually initiated the transaction. If not addressed, this circumstance effectively eliminates security checking and accountability for transactions to server A192.

Figure 12:
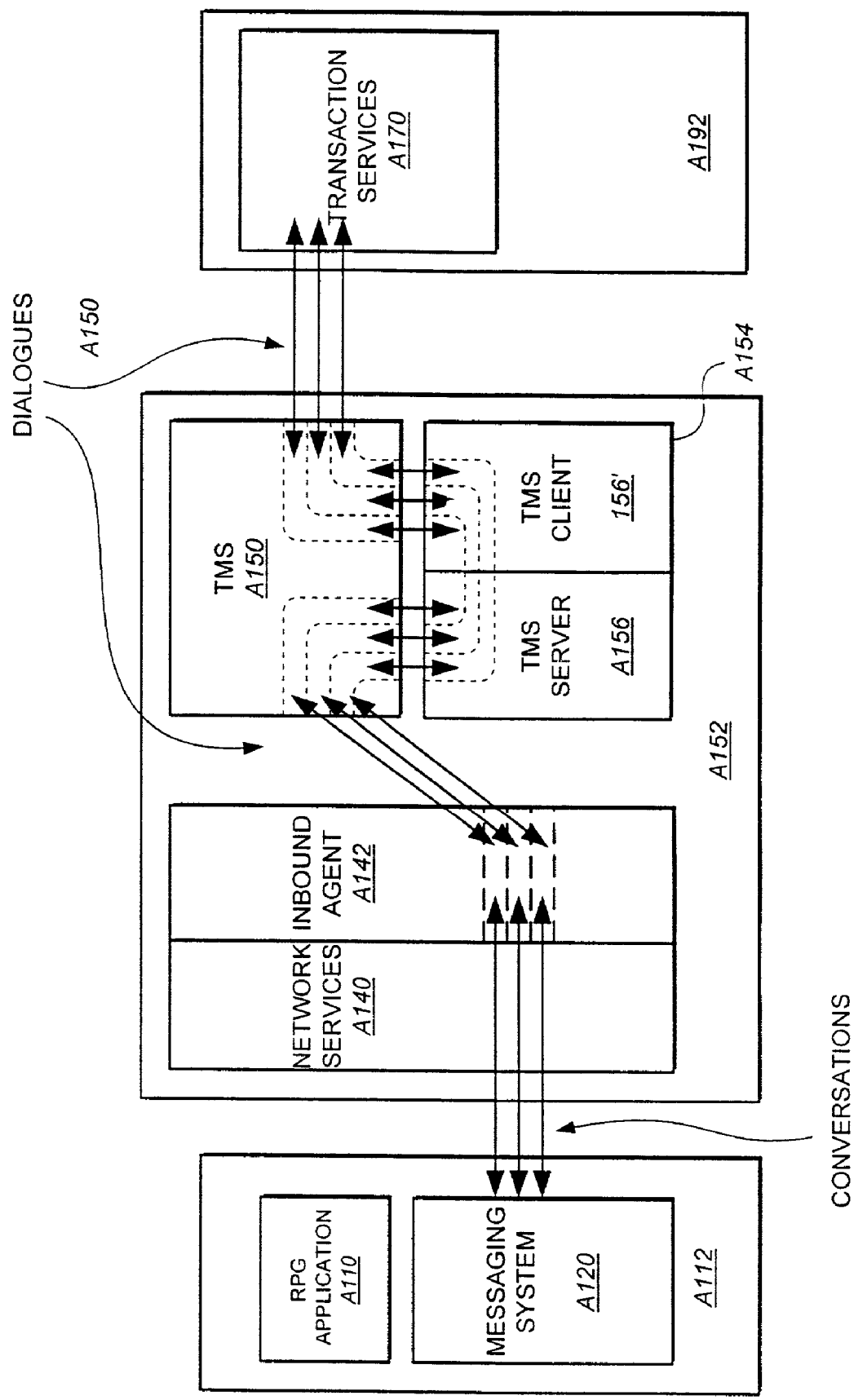
FIG. 12 is a block diagram of the network system of FIG. 6, including a security service in the gateway server.

In order to ensure both security checking and accountability for transactions to server A192, the preferred embodiment of system A100 incorporates a security service (SIGNON SECURITY SERVICE, SSS) A154 in the TE transaction management system A150 on gateway server A152. Referring now to FIG. 12, there is shown a block diagram of a preferred configuration for gateway server A152, in which transaction management system A150 is coupled to transaction services A160 through SSS A154. SSS A154 comprises a TE client A156 and a TE server A156' coupled back-to-back through a client/server interface (CSI) provided by transaction management system A150.

IA A142 incorporates an integral client which accesses SSS A154 through transaction management system A150 on behalf of messaging system A120. On initialization of messaging system A120, network services module A140 spawns IA A142, which forwards a SIGNON message, including a non-generic userid to transaction management system A150. IA A142 establishes a dialogue with SSS A154 by passing a request for SSS services through transaction management system A150, using the generic userid provided in the configuration file of IA A142. Transaction management system A150 forwards the request to SSS A154, establishing a dialogue between TE server A156 and RPG application A110 (via messaging system A120). TE server A156 then triggers TE client A156' to sign onto transaction management system A150 using the non-generic userid embedded in the signon message. SSS A154 confirms to messaging system A120 that the dialogue has been established, and sets a flag holding the dialogue open. Thereafter, transaction services A170 are accessed by TE client A156' in response to message packets (I) from messaging system A120.

I claim:

1. A computer-implemented method for tracking patronage of a plurality of customers at a plurality of casino properties, the method comprising:
    maintaining a first account associated with a customer at a first casino property;
    collecting betting activity associated with the customer's gaming activity at the first casino property;
    updating the first account to reflect comps awarded to the customer based on the collected betting activity;
    identifying the customer at a second casino property where second casino property is not the first casino property;
    responsive to identifying the customer at the second casino property, automatically retrieving customer account data maintained in the first account from the first casino property; and
    providing comps redemption to the customer at the second property.

2. The method of claim 1 wherein the comps include a hotel room.

3. The method of claim 1 wherein the comps include a meal.

4. The method of claim 1 wherein the comps include an event ticket.

5. The method of claim 1 further comprising updating the first account to reflect comps redeemed by the customer at the second property.

6. The method of claim 1 further comprising:
    collecting second betting activity associated with the customer's gaming activity at the second casino property; and
    updating the first account to reflect comps awarded to the customer based on the collected second betting activity.

7. A computer-implemented method for tracking patronage of a plurality of customers at a plurality of casino properties, the method comprising:
    maintaining a first account associated with a customer at a first casino property;
    collecting first betting activity associated with the customer's gaming activity at the first casino property;
    updating the first account to reflect points awarded to the customer based on the collected first betting activity and a first weighting factor;
    identifying the customer at a second casino property; where second casino property is not the first casino property,
    collecting second betting activity associated with the customer's gaming activity at the second casino property; and
    updating the first account to reflect points awarded to the customer based on the collected second betting activity and a second weighting factor that is different than the first weighting factor.

8. The method of claim 7 further comprising providing points redemption to the customer at the second property.

9. The method of claim 7 wherein the first weighting factor is determined at least in part by a time period at which the first betting activity is collected.

* * * * *